United States Patent
Nagasaka et al.

(10) Patent No.: US 7,176,899 B2
(45) Date of Patent: Feb. 13, 2007

(54) DISPLAY SCREEN OPERATION DEVICE

(75) Inventors: Chikao Nagasaka, Aichi-ken (JP);
Yoshimasa Kunimatsu, Aichi-ken (JP);
Yasuhiro Fujioka, Aichi-ken (JP);
Michimasa Ito, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 325 days.

(21) Appl. No.: 10/354,182

(22) Filed: Jan. 30, 2003

(65) Prior Publication Data

US 2004/0012579 A1    Jan. 22, 2004

(30) Foreign Application Priority Data

Jan. 31, 2002   (JP)   .............................. 2002-023727

(51) Int. Cl.
  *G06F 3/00*   (2006.01)
  *G06F 9/00*   (2006.01)
  *G06F 17/00*  (2006.01)
  *G09G 5/00*   (2006.01)

(52) U.S. Cl. ...................... 345/173; 715/815; 715/825; 715/829

(58) Field of Classification Search ........ 345/173–178, 345/204; 715/840
See application file for complete search history.

(56) References Cited

U.S. PATENT DOCUMENTS

| | | | | |
|---|---|---|---|---|
| 5,189,732 A | * | 2/1993 | Kondo | 715/840 |
| 5,266,931 A | * | 11/1993 | Tanaka | 345/173 |
| 5,627,567 A | * | 5/1997 | Davidson | 345/173 |
| 5,757,359 A | * | 5/1998 | Morimoto et al. | 345/156 |
| 6,373,472 B1 | * | 4/2002 | Palalau et al. | 345/173 |
| 6,424,338 B1 | * | 7/2002 | Anderson | 345/173 |
| 6,429,846 B2 | * | 8/2002 | Rosenberg et al. | 345/156 |

FOREIGN PATENT DOCUMENTS

JP    11-127399    5/1999

* cited by examiner

Primary Examiner—Sumati Lefkowitz
Assistant Examiner—Alexander S. Beck
(74) Attorney, Agent, or Firm—Roberts, Mlotkowski & Hobbes; Thomas W. Cole

(57) ABSTRACT

In a state in which any one of selection buttons is selected (state in which a color is reversed), a touch panel in a controller is operated, and, the selected state of the selection button is released when an operation signal from the above controller is corresponding to a moving trajectory from a gray zone to another gray zone through a cancellation zone. Thereby, unnatural feeling at operation caused by distance between a finger position on the touch panel of the controller and a position of the selection button in the selected state is reduced or eliminated.

10 Claims, 21 Drawing Sheets

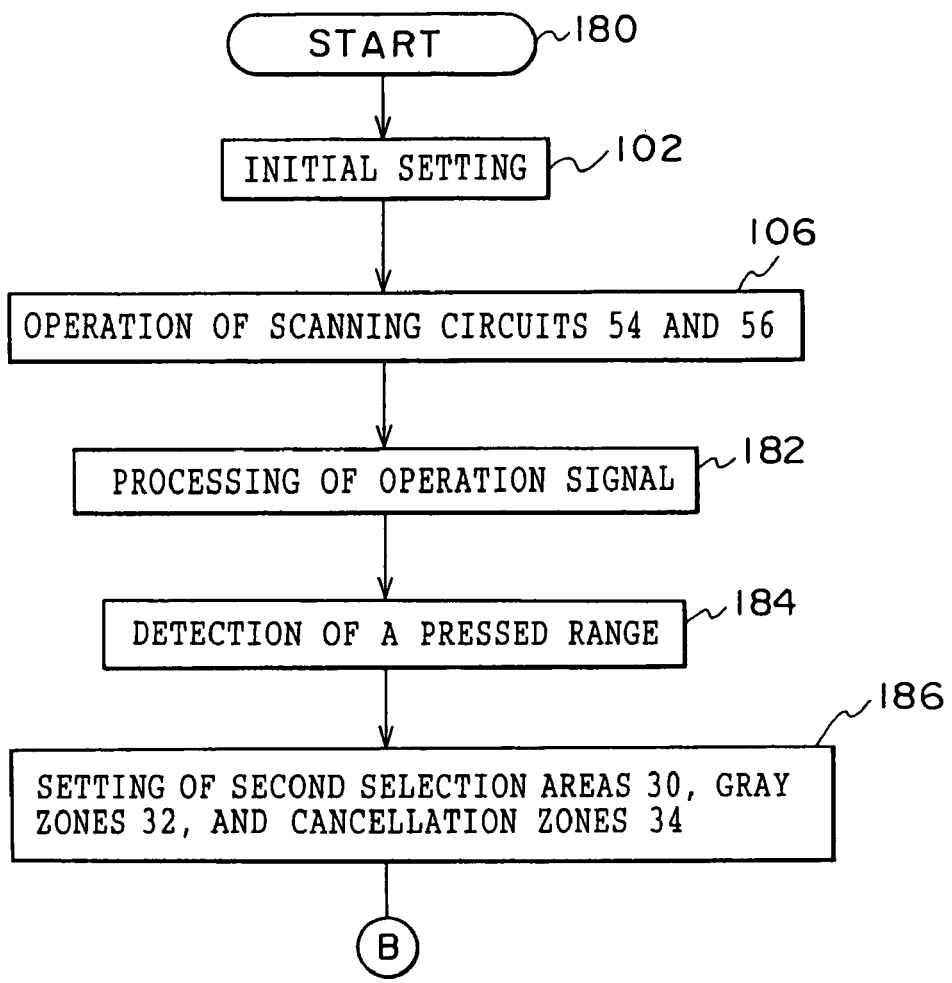

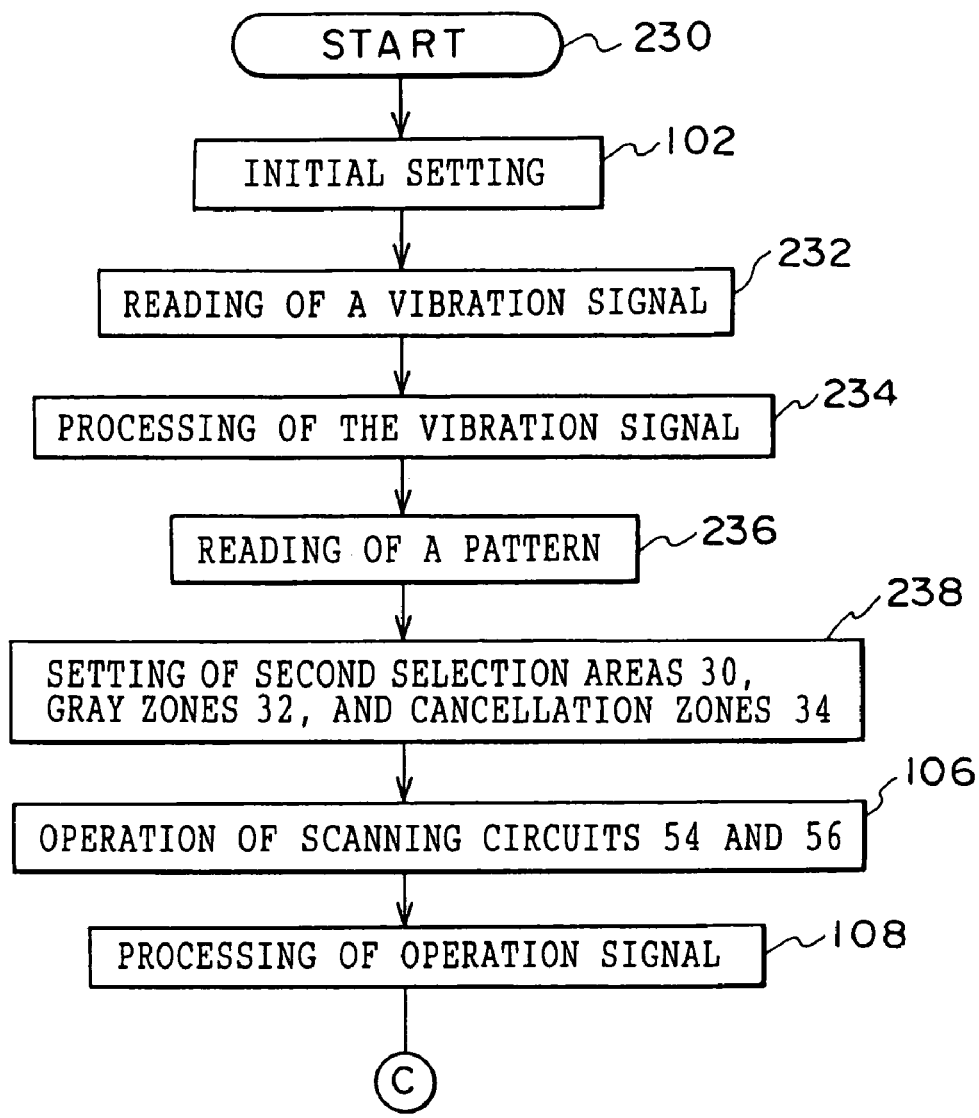

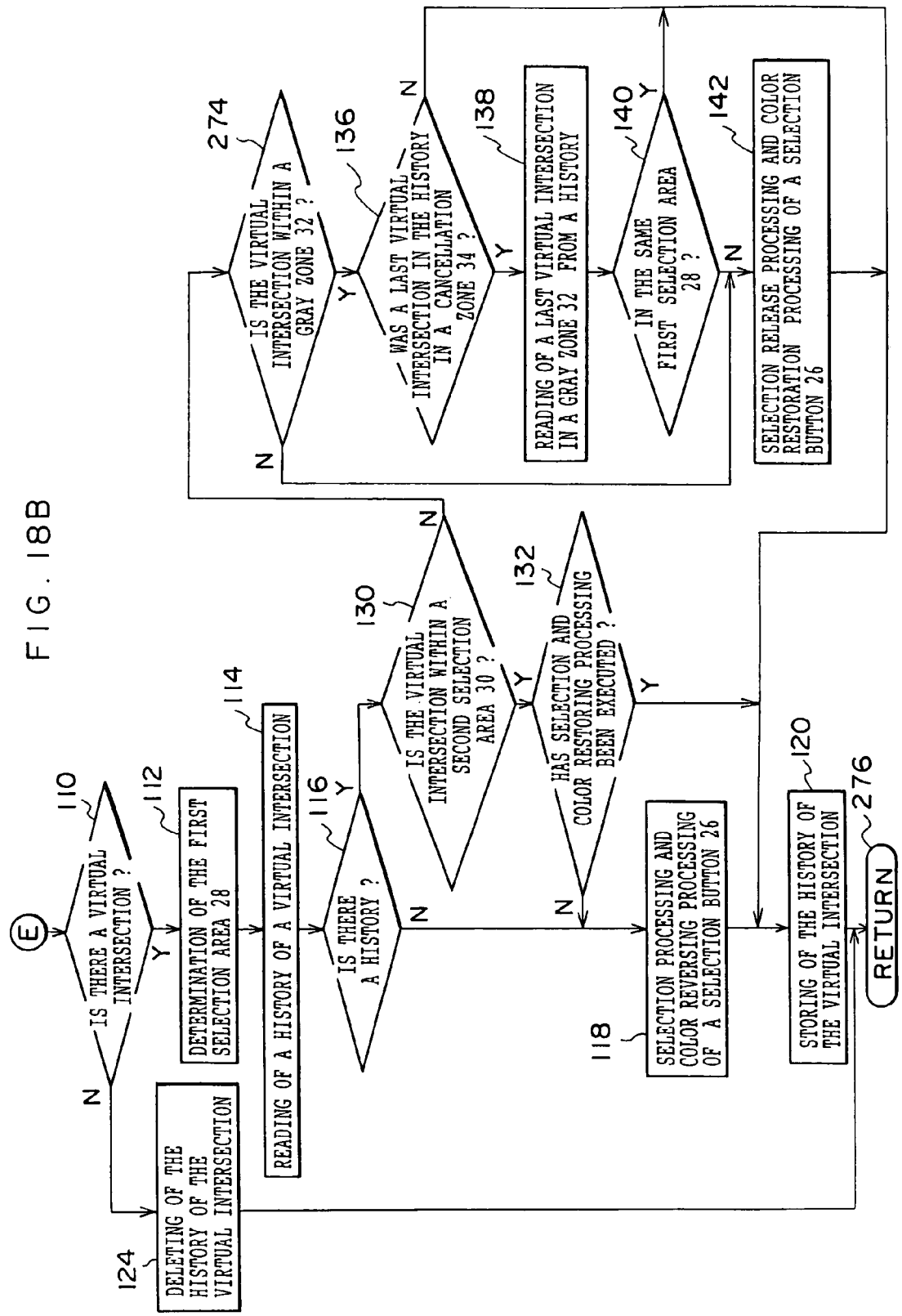

DISPLAY SCREEN OPERATION DEVICE

BACKGROUND OF THE INVENTION

1. Field of the Invention

The present invention relates to a display screen operation device which is applied to various kinds of devices, such as a car navigation device and an audio device of a vehicle, in which various kinds of operations are executed under confirmation of a display screen as a monitor.

2. Description of the Related Art

Recently, there has been a vehicle which is provided with a monitor having a monitoring display screen on an instrument panel or in a housing section formed in the instrument panel of the vehicle, and in which, for example, a map display screen and the like is displayed on the monitoring display screen of the car navigation device.

Moreover, since various kinds of devices such as an audio device and an air-conditioning device as well as the above-described car navigation device are installed on the vehicle, a configuration is also being considered, for example, in which a virtual control panel comprising icons, which correspond to each of various kinds of devices, and the like is displayed on the display screen of the monitor, a display screen of the monitor is switched to a virtual control panel corresponding to a desired device, using a controller, and a pointer or the like displayed on the display screen of the monitor is moved onto an icon, which corresponds to the contents of a desired control or operation, using the controller, to select the icon in order to execute the desired control or operation.

In such a configuration, there is an advantage that one controller can operate and control various kinds of devices even when the number of devices installed in the vehicle is increased.

On the other hand, controllers used for the above devices include one having a configuration in which a touch panel is provided in a part of the main body of the controller.

That is, according to the configuration, a coordinate position on the touch panel of the controller is set in correspondence to a coordinate position on the display screen of the monitor to move a finger and the like on the touch panel and to move a pointer displayed on the display screen of the monitor.

Here, when the above-described controller is operated, for example, in a moving vehicle, a pointer is sometimes slightly moved on the display screen of the monitor, following the movement of a finger on the touch panel due to vibration of the vehicle. As a result, for example, the following situations occur: the pointer is located on an icon which is not intended to be selected, and the icon is put into a selected state (for example, the color of the icon is changed); and the pointer frequently moves among a plurality of icons in a short time, and a plurality of icons are alternately put into the selected state in a short time.

In order to prevent the above disadvantages, a configuration (refer to Japanese Patent Application Laid-Open (JP-A) No. 11-127399 as one example) has been considered in which a gray zone is set between adjoining icons, and the existing selected state of an icon is not released (not cancelled) when the pointer is located within a predetermined range even if the pointer deviates from the icon.

However, when the gray zone is set as described above, there occurs a phenomenon that the selected state is maintained though a finger position on the touch panel is greatly away from the selected icon. Since such a phenomenon causes an unnatural feeling that operational feeling on the touch panel does not correspond to the state of the display screen of the monitor, there is much room for improvement from the viewpoint of the operability.

Especially, for example, when vibration in the vehicle is extremely slight, for example, when the vehicle is stopped, and movement of a finger on the touch panel is basically small, the above described problems are much less liable to occur, but, instead, the above described unnatural feeling becomes large.

SUMMARY OF THE INVENTION

An object of the present invention is to provide a display screen operation device which causes less unnatural feeling at operation and has high operability.

A first aspect of the invention provides a display screen operation device comprising: an operation unit which transmits an operation signal including position information according to a position on a display screen of a monitor by a predetermined operation; and a control unit which is connected to the monitor, displays a plurality of selection sections at predetermined positions on the display screen, puts the selection section into a selected state when the position information of the operation signal sent from the operation unit is corresponding to any one of the plurality of selection sections in a display state of the plurality of selection sections, sets a release area at a position away from each of the plurality of selection sections on the display screen and, between the plurality of selection sections, and releases the selected state when the operation signal including the position information corresponding to the inside of the release area is received in the selected state, or, when the operation signal including the position information corresponding to an area other than the release area is received.

In the display screen operation device with the above configuration, a plurality of selection sections are displayed on a display screen of the monitor by the control unit. When the operation unit is operated, and an operation signal is sent to the control unit under such a condition, relevant selection section is put into a selected state in the control unit if position information included in the operation signal is corresponding to positions of any of selection sections on the display screen of the monitor.

Incidentally, release areas are set on the display screen of the monitor by the control unit under a state in which a plurality of selection sections are displayed on the display screen of the monitor. The release areas are set at positions away from each of the plurality of selection sections on the display screen of the monitor and between the plurality of selection sections.

Here, when an operation signal including position information corresponding to positions in the release area, or an operation signal including position information corresponding to an area other than the release area is sent from the operation unit to the control unit under a state in which any of the plurality of selection sections are selected, the above selected state is released by the control unit.

Thereby, there is caused no feeling of difference between operations of the operation unit and display on the display screen of the monitor, that is, the selection sections at positions away from the positions corresponding to the position information in the operation signal are still in the selected state. Therefore, the screen display corresponding to the operational feeling can be realized to improve the operability.

A second aspect of the invention provides a display screen operation device comprising: an operation unit which transmits an operation signal including position information according to a position on a display screen of a monitor by a predetermined operation; and a control unit which is connected to the monitor, displays a plurality of selection sections at predetermined position on the display screen, put the selection section into a selected state when the position information of the operation signal sent from the operation unit is corresponding to any one of the plurality of selection sections in a display state of the plurality of selection sections, set a maintenance area in a predetermined range on the display screen including any one of the plurality of selection sections inside the range, corresponding to each of the plurality of selection sections, maintains the state of the display screen in a state before receiving the operation signal when the position information of the operation signal from the operation unit is corresponding to a position within the maintenance area and excluding the selection sections with in the maintenance area, and, further, changes the setting range of the maintenance area based on predetermined conditions.

In the display screen operation device with the above configuration, a plurality of selection sections are displayed on a display screen of the monitor by the control unit. When the operation unit is operated, and an operation signal is sent to the control unit under such a condition, relevant selection section is put into a selected state in the control unit if position information included in the operation signal is corresponding to positions of any of selection sections on the display screen of the monitor.

Incidentally, a plurality of maintenance areas are set on the display screen of the monitor by the control unit under a state in which a plurality of selection sections are displayed on the display screen of the monitor. Each of the maintenance areas are set corresponding to each of the plurality of selection sections, and include the corresponding selection sections within the areas (that is, the maintenance areas are set on the peripheries of the corresponding selection sections).

When the control unit receives an operation signal having position information corresponding to positions within the maintenance areas except the corresponding selection sections, the display state of the display screen of the monitor is maintained by the control unit in a state before the operation signal is received.

Thereby, even when an operation signal including position information on positions, which are away from the selection sections due to ambiguous operations or small movements of a finger, has been transmitted immediately after any of the selection sections are selected by operation of the operation unit, the selected states of the selection sections do not change. Thereby, the operability is improved, as careful and strict operation is not required at operation of the operation unit.

Here, the sizes of the maintenance areas are changed, based on predetermined conditions, in the display screen operation device.

Therefore, it is possible by reducing the sizes of the maintenance areas to properly change the display state of the display screen of the monitor according to change in the operation of the operation unit (that is, selection, release, and switching of the selection sections) under a state in which it is difficult to cause ambiguous operation of the operation unit or small movements of a finger. Thereby, the operability is improved.

Also, for example, when an environment at operation of the operation unit is a place (for example, in a room of a vehicle under running) in which devices are comparatively easily vibrated, release of selected states of selection sections and the like, which is caused by unintentional operation of the operation unit in an environment in which devices are easily vibrated, may be prevented by enlarging the sizes of the maintenance areas. From the above reason, the operability is improved.

A third aspect of the invention provides a display screen operation device, according to the first aspect, comprising: a notification signal transmission unit which is operated when the control unit receives the operation signal including the position information corresponding to a position at a predetermined distance away from the selection section on the display screen, and transmits a predetermined notification signal.

In the display screen operation device with the above-described configuration, when position information on an operation signal which the control unit received from the operation unit is one corresponding to positions at a predetermined range away from the selection sections on the display screen of the monitor, the notification signal transmission unit transmits a predetermined notification signal, which can be recognized by any one of the five senses, such as light, sound, and vibration, of a user. Thereby, operation results by the operation unit may be understood without careful watching of the display screen of the monitor.

Here, though the display screen operation device has a configuration by which the notification signal transmission unit transmits a predetermined notification signal, the notification signal is not limited to forms, such as light, sound, and vibration (pressure), as described above, if it is a signal which can be recognized by any one of the five senses of a user. Also, when the notification signal is light, the monitor may be also used as the notification signal transmission unit. Furthermore, when the notification signal is vibration, pressure, and the like, the notification signal transmission unit may be provided in the operation unit, if the operation unit has a basic configuration by which the unit always touches the body (for example, a palm or a finger) of a user at operation.

A fourth aspect of the invention provides a display screen operation device, according to the third aspect, wherein the notification signal transmission unit changes the notification signal gradually or stepwise as the position on the display screen corresponding to the position information approaches the selection section.

In the display screen operation device with the above-described configuration, the notification signal is changed gradually or stepwise as the position on the display screen of the monitor corresponding to the position information in the operation unit approaches the selection section.

Here, for example, in the case of a notification signal with no change, it is possible to understand that the operation unit transmits an operation signal including position information corresponding to the position at a predetermined range away from a selection section. However, it is impossible to understand whether the position information is on a position very near the selection section, or on a position near the border of the above-described predetermined range. Accordingly, it is impossible to understand what kinds of operations of the operation unit are required for selection of the selection sections after transmission of the notification signal.

However, since, in the display screen operation device, it is possible to understand by change in the notification signal the difference between the positions of the selection sections and the positions on the display screen of the monitor corresponding to the position information included in the operation signal, selection of the selection sections can be realized by using the change in the notification signal as a clue without careful watching of the display screen of the monitor. Thereby, the operability is improved.

BRIEF DESCRIPTION OF THE DRAWINGS

FIG. 10A and FIG. 10B are schematic flow charts showing control of the display screen operation device according to the second embodiment of the invention.

FIG. 14A and FIG. 14B are schematic flow charts showing control of the display screen operation device according to the third embodiment of the invention.

FIG. 18A and FIG. 18B are schematic flow charts showing control of the display screen operation device according to the fifth embodiment of the invention.

DETAILED DESCRIPTION OF THE EMBODIMENTS

<Configuration of First Embodiment>

Figure 1:
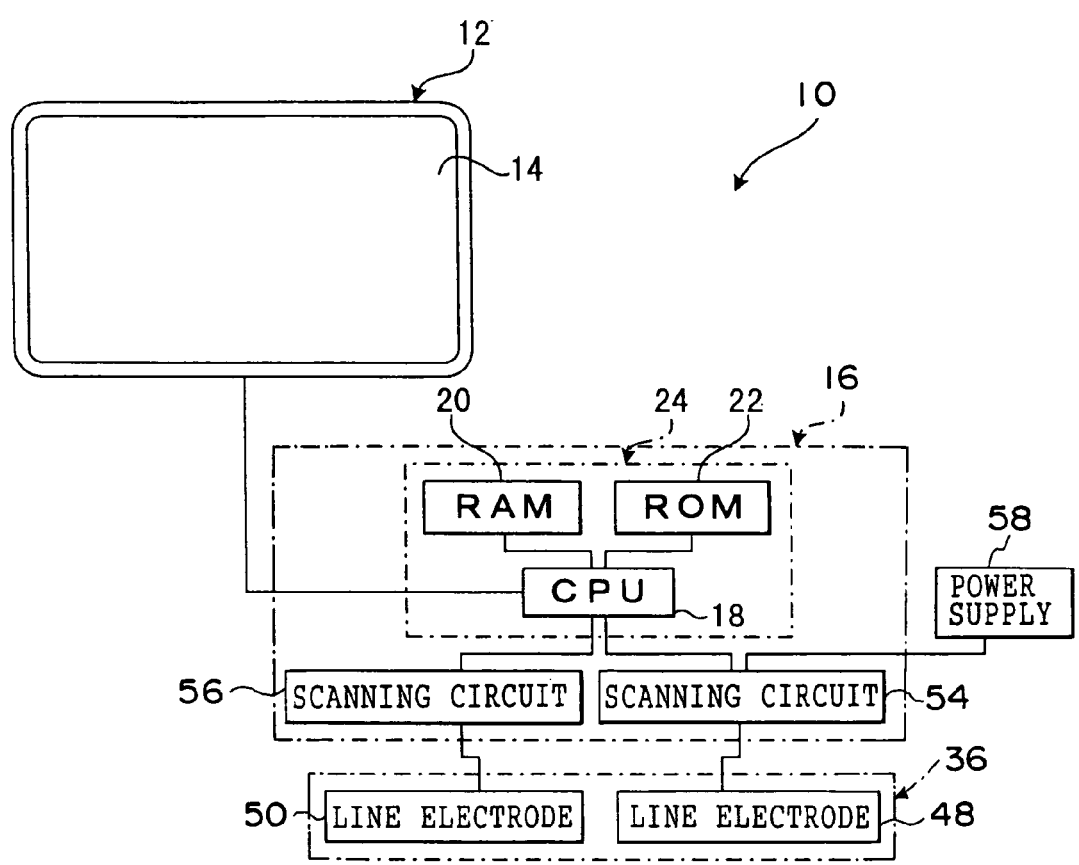
FIG. 1 is a schematic block diagram showing a configuration of a display screen operation device according to a first embodiment of the present invention.

FIG. 1 shows a schematic view of a configuration of a central control device 10 to which a display screen operation device according to a first embodiment of the present invention is applied.

Figure 6:
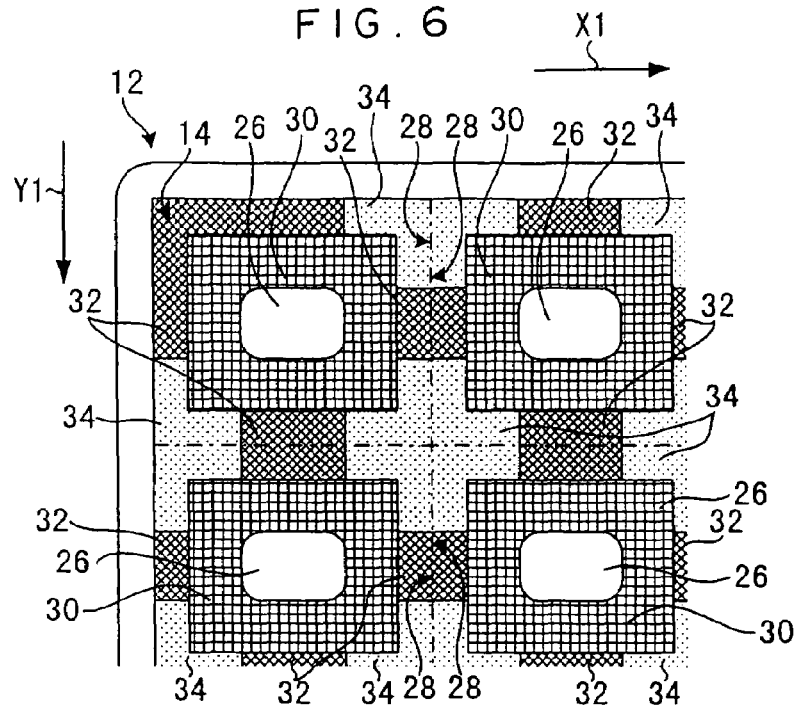
FIG. 6 is a schematic view showing positions of each area in a display screen of a monitor.

As shown in FIG. 1, the central control device 10 is provided with a monitor 12 as a monitor. The monitor 12 is installed, for example, at a predetermined position on an instrument panel of a vehicle (not shown), or in a housing hole formed in the panel in a state that a vehicle crew may see a display screen 14 with an approximately rectangular shape. Hereinafter, explanation will be made, assuming for convenience that the transverse (lengthwise) and right direction is the X1 direction, and the longitudinal (crosswise) and downward direction of the monitor 12 is the Y1 direction as shown in FIG. 6.

Also, as shown in FIG. 1, the monitor 12 is connected to a control section 16 as a control unit which is provided at an appropriate position of the vehicle. The control section 16 comprises a computer 24 with a configuration including, for example, a CPU 18, a RAM 20, and a ROM 22. The control section 16 is configured to control the monitor 12, such that a plurality of selection buttons (icons) 26 as a selection section which selects a function and operation contents of the central control device 10 are displayed on the display screen 14 of the monitor 12 in the directions of X1 and Y1 at a predetermined distance, as shown in FIG. 6.

Also, the computer 24 in the control section 16 displays a plurality of selection buttons 26 on the display screen 14 of the monitor 12 as described above, and sets an unvisible first selection area 28 with an approximately rectangular shape on the display screen 14. A plurality of first selection areas 28 are set, corresponding to each of selection buttons 26, and are adjacent to each other on the display screen 14. Moreover, the corresponding selection buttons 26 are located inside of the areas (for example, approximately at the center), respectively.

In addition, each of the first selection areas 28 comprises: a second selection areas 30 which is unvisible on the display screen 14; a gray zone 32 as a maintenance area; and a cancellation zone 34 as a release area. The second selection area 30 has an approximately rectangular shape smaller than the first selection area 28, and the corresponding selection button 26 is located within the area (for example, approximately at the center).

On the other hand, the gray zone 32 touches the second selection area 30 at the side of the second selection area 30 along the X1 and Y1 directions. The gray zone 32 is set approximately in a belt shape between the end part (edge) of the corresponding first selection area 28 and the end part (edge) of the corresponding second selection areas 30. Therefore, the second selection area 30 does not touch other adjoining second selection areas 30.

Also, the above gray zone 32 is not set near the corner parts excluding the corner corresponding to the four corners of the display screen 14 among corner parts of each second selection area 30. Instead, the cancellation zones 34 are set near the corners to touch the second selection areas 30. The cancellation zones 34, as well as the gray zones 32, are also set approximately in a belt shape between the end parts (edges) of the corresponding first selection areas 28 and the end parts (edges) of the corresponding second selection areas 30, and the end parts of the cancellation zones 34 which are located between corners of the second selection areas 30 touch the end parts of the gray zones 32.

Here, the second selection areas 30, the gray zones 32, and the cancellation zones 34 are shown respectively with patterns in drawings including FIG. 6. However, the above patterns are provided for easy understanding of the contents of the drawings, the above areas and the zones are actually unvisible as described above, and the patterns are not actually provided.

Figure 2:
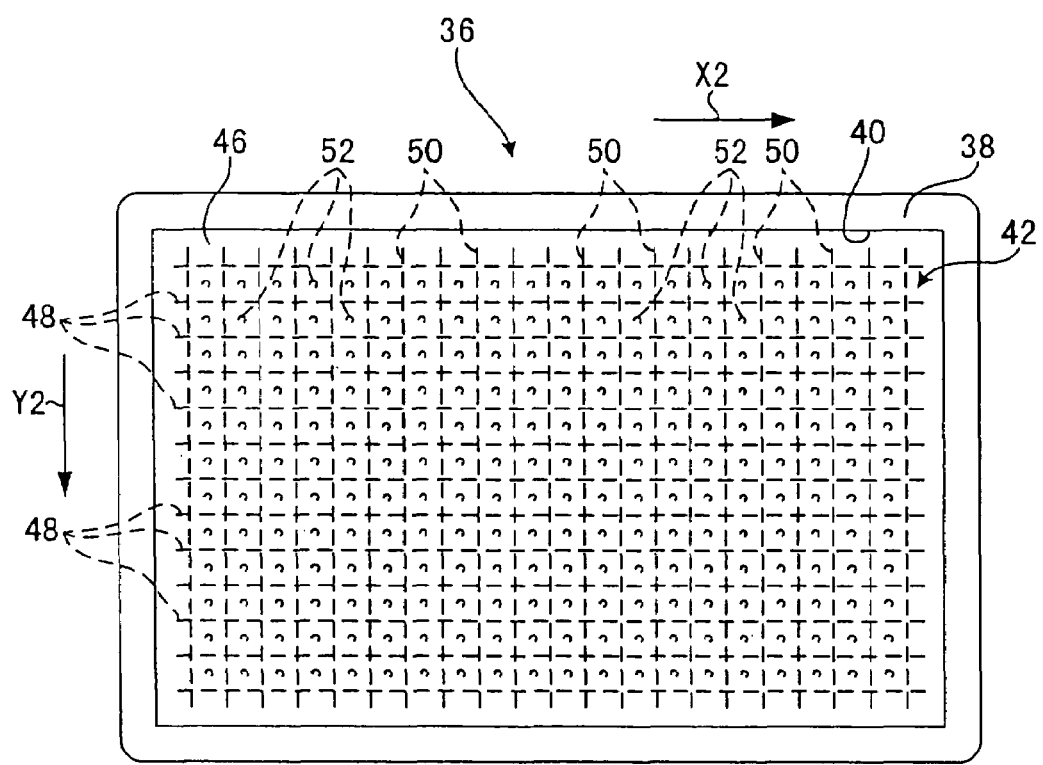
FIG. 2 is a plan view of a controller as an operation unit.

On the other hand, the central control device 10 is provided with a controller 36 as an operation unit as shown in FIG. 1. As shown in FIG. 2, the controller 36 is provided with a case 38 with an approximately box shape. A hole 40 with an approximately rectangular shape is formed on one side wall (for example, a side wall at one side in the thickness direction) of the case 38, and a touch panel 42 with an approximately rectangular shape is provided in the hole 40. Hereinafter, explanation will be made, assuming for convenience that the transverse (lengthwise) and right direction is the X1 direction, and the longitudinal (crosswise) and downward direction of the touch panel 42 is the Y1 direction as shown in FIG. 6.

Figure 3:
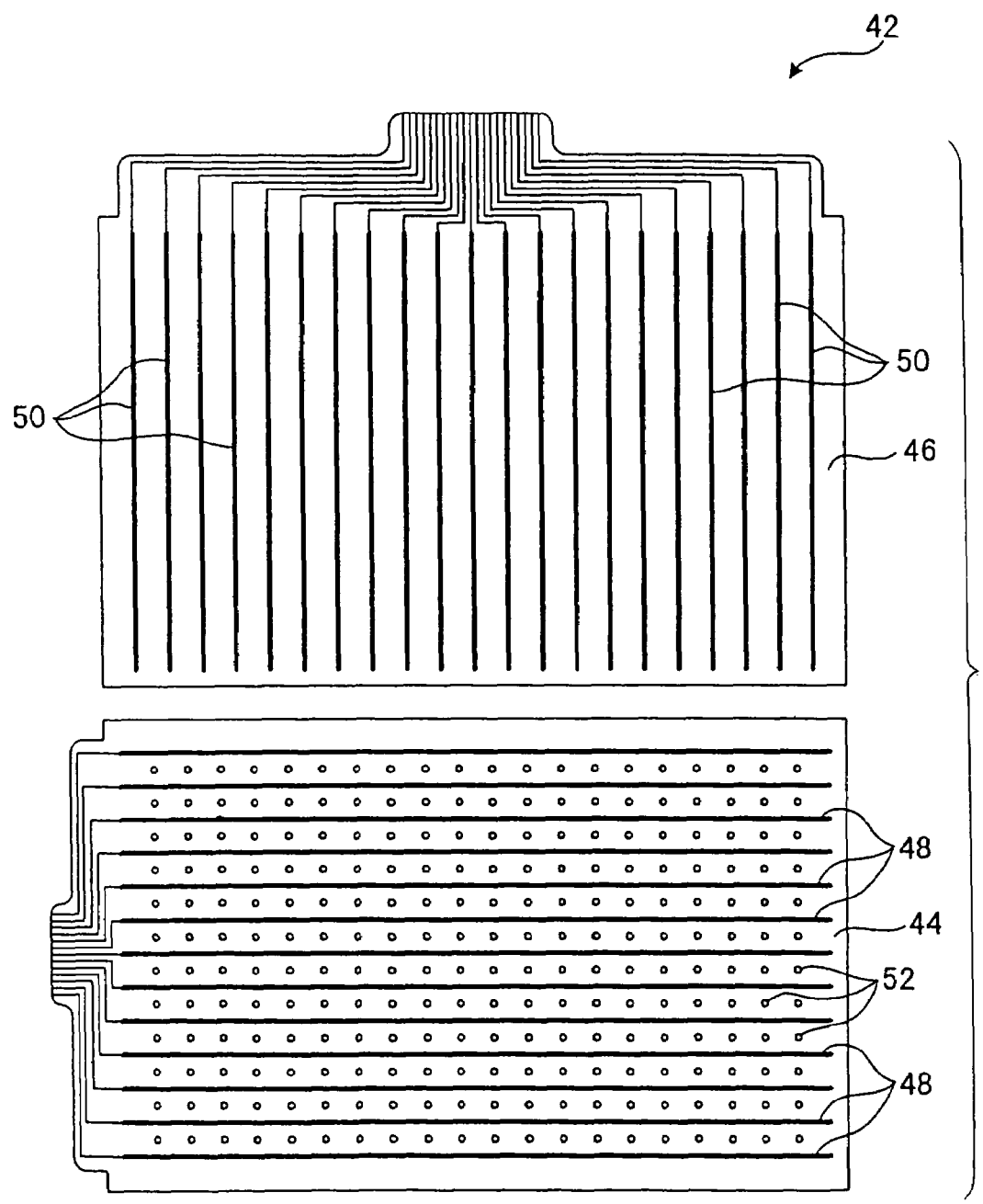
FIG. 3 is a development plan view of a touch panel used as a controller.

As shown in FIG. 3, the touch panel 42 is provided with one pair of sheets 44 and 46 each of which is corresponding to the hole 40. The sheets 44 and 46 are formed in a shape of a flexible sheet with an approximately rectangular shape, using an insulating material such as a plastic material. A plurality of line electrodes 48 are formed on one surface of the sheet 44. The line electrodes 48 are formed in a shape of a straight line, using an electrically conductive material such as metallic foil (for example, copper foil), and are provided on the sheet 44 at a predetermined distance in the Y2 direction of the sheet 44 so that each line electrode 48 is arranged lengthwise in the X2 direction.

On the other hand, a plurality of line electrodes 50 are formed on one surface of the sheet 46. The line electrodes 50 are formed in a shape of a straight line, using an electrically conductive material such as metallic foil (for example, copper foil), and are provided on the sheet 46 at a predetermined distance in the X2 direction of the sheet 46 so that each line electrode 50 is arranged crosswise in the Y2 direction.

The one surface of the sheet 46 is overlapped with the one surface of the sheet 44, while facing each other, in a state that the longitudinal direction of the sheet 46 and that of the sheet 44 are in accordance with each other. And, the line electrodes 50 are facing the line electrodes 48 along the thickness directions of the sheets 44 and 46 in a state that the electrodes 50 and 48 are intersecting each other in an approximately perpendicular manner (refer to FIGS. 4A and 4B).

On the other hand, dot spacers 52 with an approximately hemispherical shape are provided on one surface of the sheet 44. As shown in FIG. 3, each dot spacer 52 is formed at an approximately center part between adjacent line electrodes 48, and at an approximately center part between adjacent line electrodes 50, and supports the sheet 46 from the side of sheet 44 so that a predetermined space is formed between the line electrode 48 and the line electrode 50 along the thickness direction of the sheets 44 and 46.

Figure 4A:
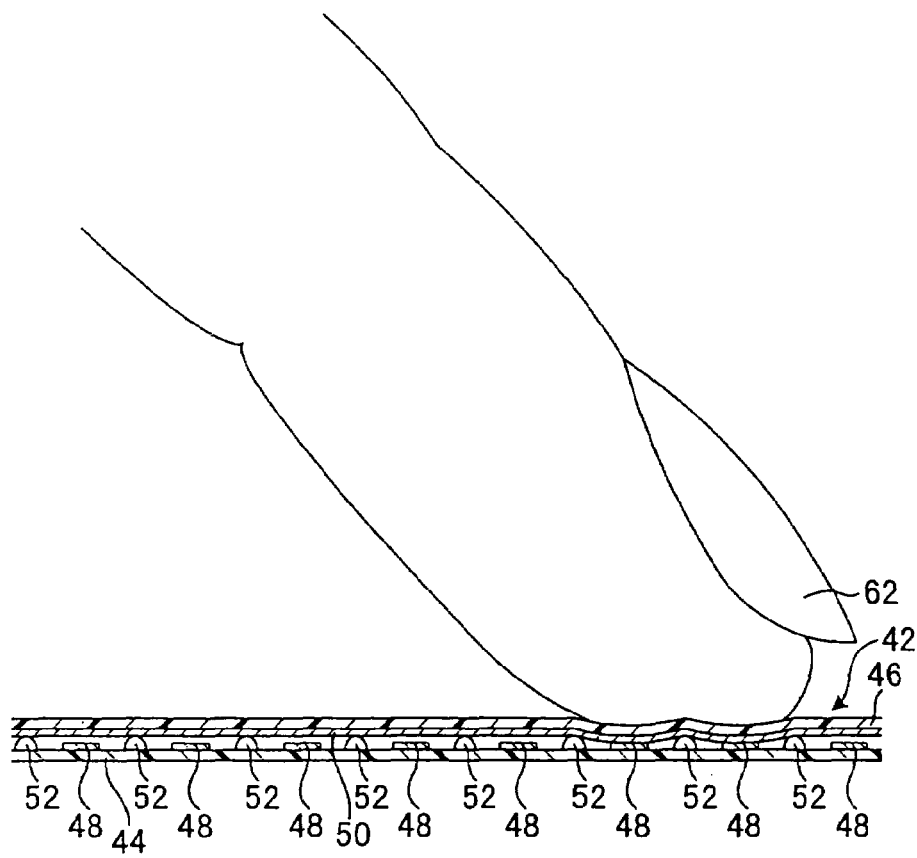
FIG. 4A is a cross section showing a touch panel which is pressed by a finger aligned generally perpendicular to the touch panel.
Figure 4B:
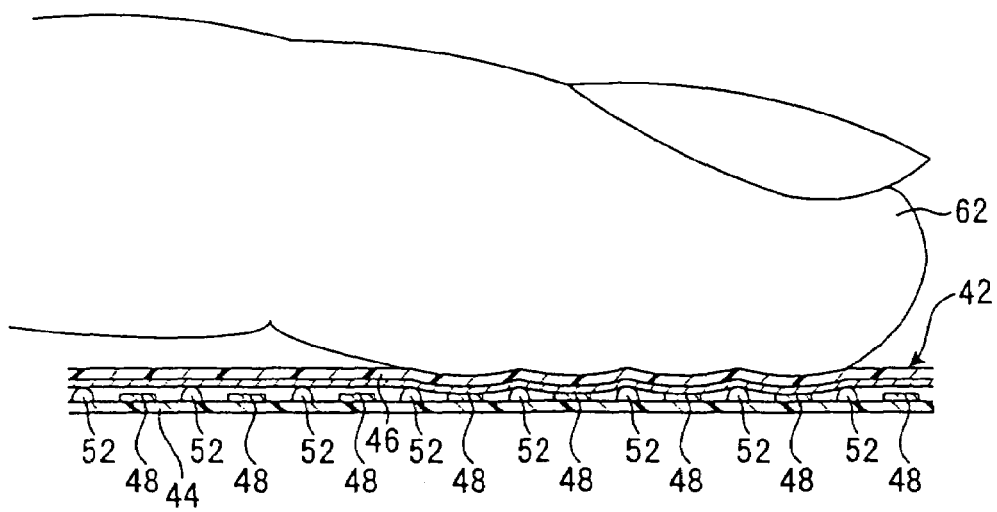
FIG. 4B is a cross section showing the touch panel which is pressed by a finger aligned generally parallel to the touch panel.
Figure 5A:
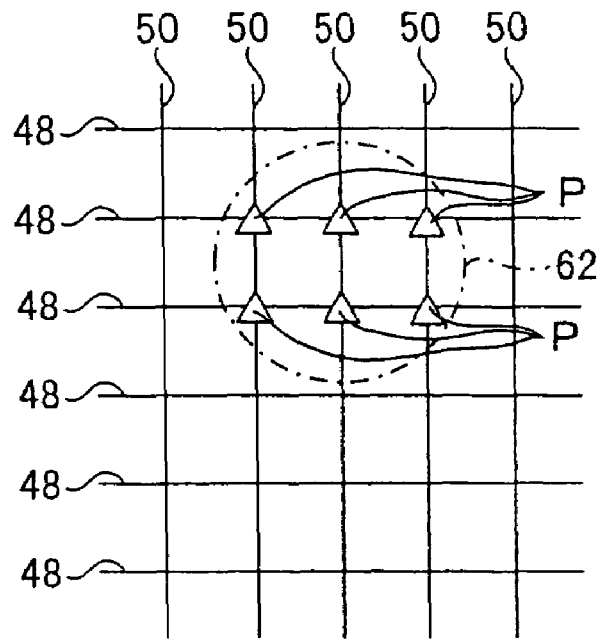
FIG. 5A is a schematic view showing a range on the touch panel which is pressed by a finger aligned generally perpendicular to the touch panel.
Figure 5B:
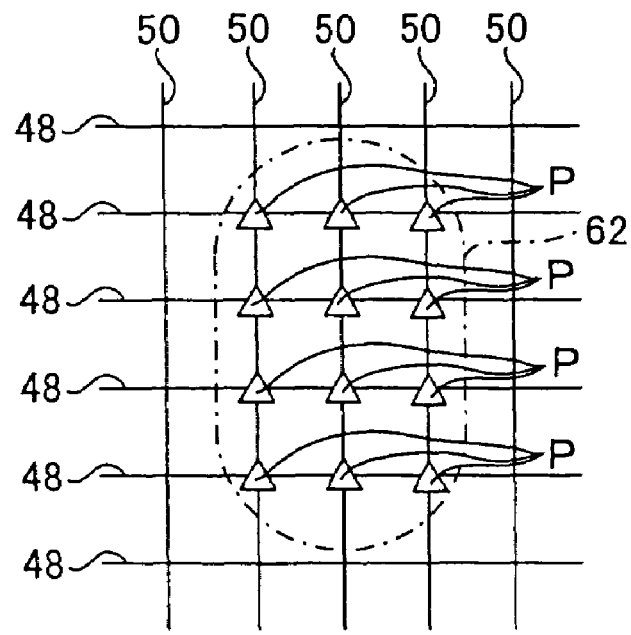
FIG. 5B is a schematic view showing a pressed range on the touch panel which is pressed by a finger aligned generally parallel to the touch panel.

According to the above configuration, when, as shown in FIGS. 4A and 4B, pressing force by a finger 62 and the like is exerted on the sheet 46 in the direction from the sheet 46 to the sheet 44, and the sheet 46 is deflected so that the sheet 46 approaches the sheet 44 the line electrodes 50 come into contact with the line electrodes 48 at the deflected parts, and both the electrodes are electrically connected to each other at the contacted parts (parts P indicated by triangles as shown in FIGS. 5A and 5B).

And, as shown in FIG. 1, each of the line electrodes 48 is connected to a power supply 58 through a scanning circuit 54 provided in the control section 16. The scanning circuit 54 is connected to the CPU 18 of the computer 24, and each of the line electrodes 48 is electrically connected to the power supply 58 according to a predetermined order under control of the CPU 18.

On the other hand, each of the line electrodes 50 is earthed through a scanning circuit 56 provided in the control section 16. The scanning circuit 56 is also connected to the CPU 18 of the above-described computer 24, and it is detected according to a predetermined order under control of the CPU 18 whether the electric current flows on each of the line electrodes 50. The detection results are feedbacked to the CPU 18 as an operation signal.

Here, the transverse direction (X2 direction) and the longitudinal direction (Y2 direction) on the back of the sheet 46 of the touch panel 42 (that is, the surface which is exposed from the hole 40 on the case 38 to the outside) are corresponding to the transverse direction (X1 direction) and to the longitudinal direction (Y1 direction) on the display screen 14 of the above-described monitor 12, respectively. Positions (hereinafter called as "virtual intersections" for convenience) on the display screen 14, which are corresponding to each of intersections between the line electrodes 48 and the line electrodes 50 on the touch panel 42, respectively, are determined by the computer 24.

<Operations, and Effects of the Embodiment>

In the central control device 10, the CPU 18 reads, for example, a navigation program and image data of a map and the like from the ROM 22 and the like, executes and processes the program, using the data, and, for example, a map showing a place near the current position, which is indicated at the center of the map, is displayed on the display screen 14 of the monitor 12.

Figure 8A:
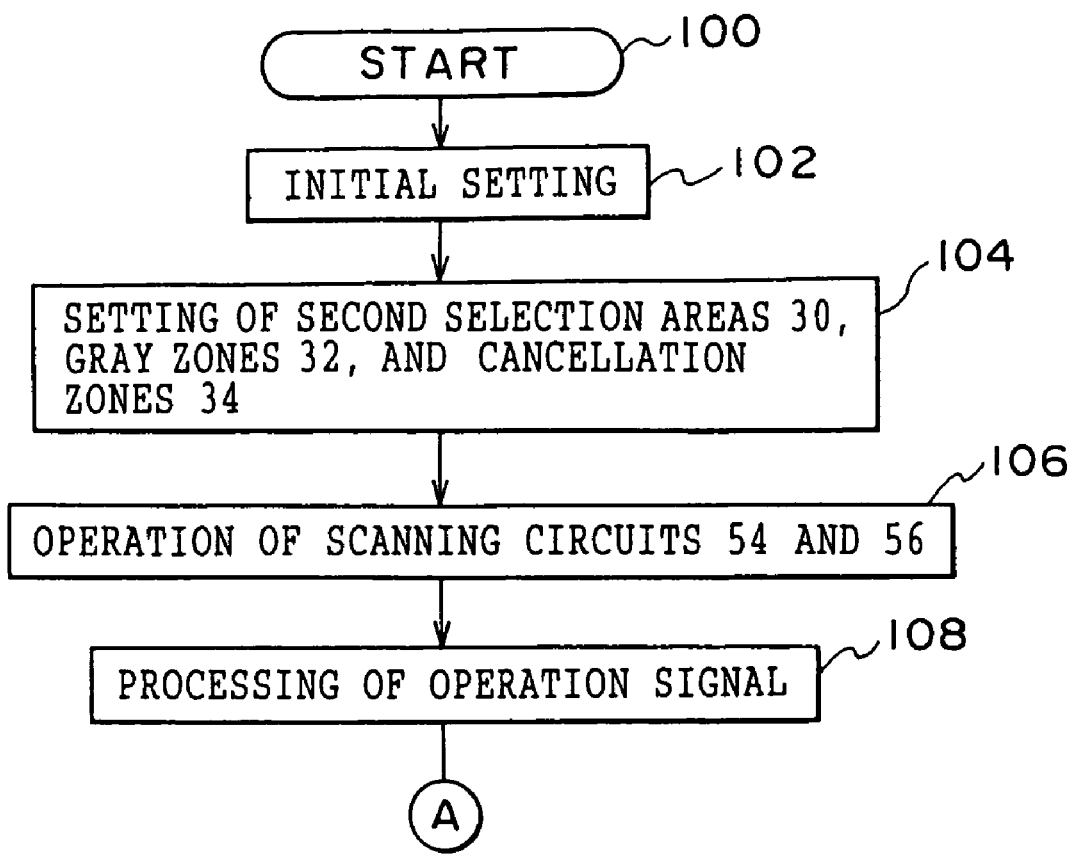
FIG. 8A and FIG. 8B are schematic flow charts showing control of the display screen operation device according to the first embodiment of the invention.
Figure 8B:
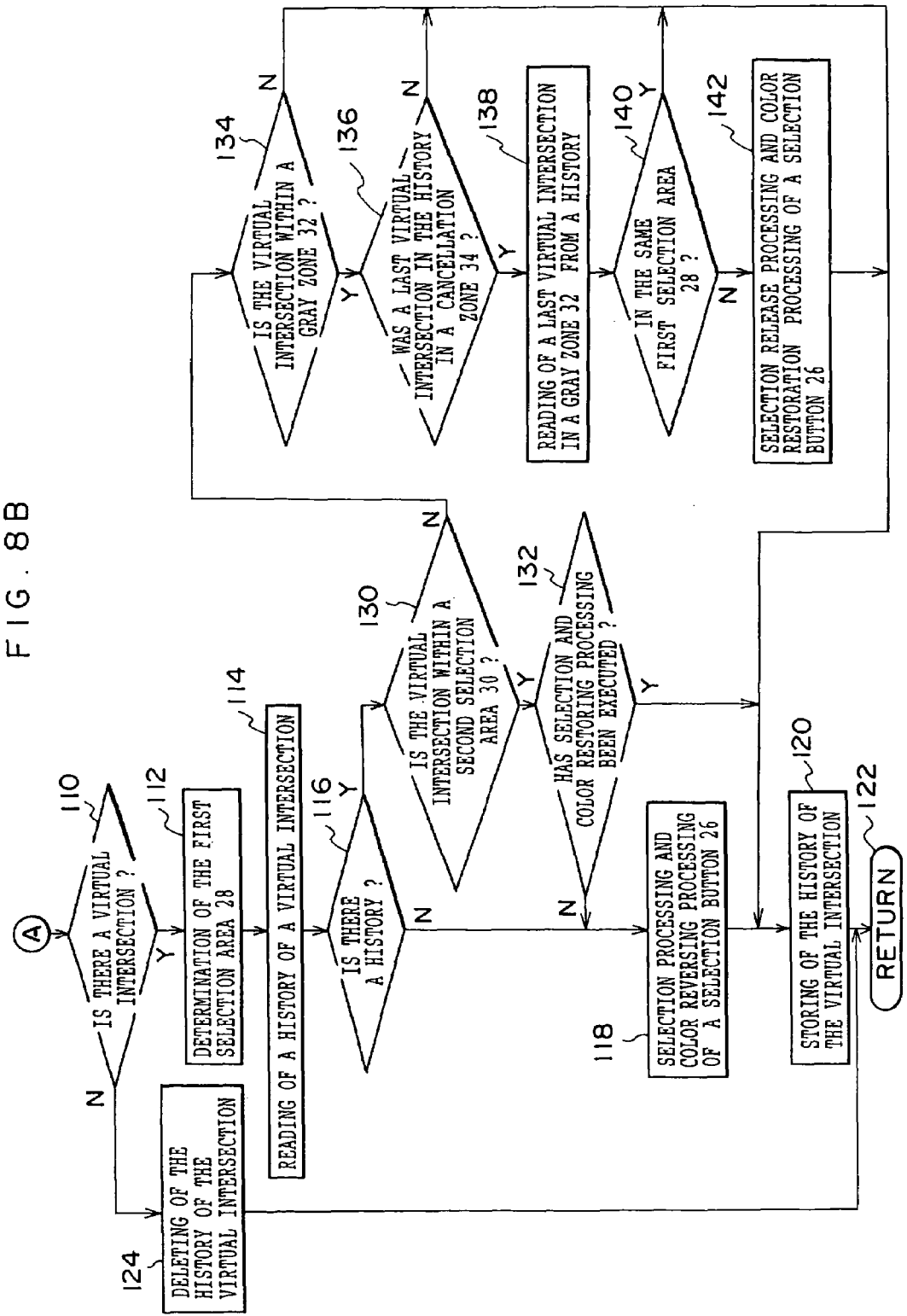

Also, when the CPU 18 reads, for example, a menu program for selection of various kinds of functions of the central control device 10, from the ROM 22 and the like, a plurality of selection buttons 26, on which various kinds of function names and the contents are indicated by characters, pictures, and the like, are displayed on the display screen 14 in a shape of a matrix as shown in FIG. 6, and a selection processing program which is schematically shown in a flow charts of FIG. 8A and FIG. 8B is read by the CPU 18 from the ROM 22 and the like.

When the selection processing program is executed at STEP 100 after the program is read, various kinds of initialization are performed at STEP 102, and, then, a second selection area 30, gray zones 32, and cancellation zones 34 are set for each selection button 26 at STEP 104.

Subsequently, the scanning circuit 54 is operated at STEP 106, each line electrode 48 is electrically connected to the power supply 58 according to a predetermined order to operate the scanning circuit 56 which detects the conducting states of each line electrodes 50 according to a predetermined order, and an operation signal including information on the conducting states is sent to the CPU 18.

Thus, the scanning circuit 54 connects each line electrode 48 to the power supply 58 in a predetermined order, and the scanning circuit 56 detects in a predetermined order whether the electric current flows on each of the line electrode 50. Thereby, The conducting states at the intersections of each line electrode 48 and each line electrode 50 are detected. In other words, coordinate positions of the parts of the sheet 46, on which the pressing force has been exerted, is detected.

When a vehicle crew touches the back of the sheet 46 of the controller 36 (touch panel 42) with a finger 62, and presses the sheet 46 in the direction to the sheet 44 with appropriate force under such a condition, the pressed parts of the sheet 46 are deflected to the side of the sheet 44 (refer to FIG. 6). Thereby, the line electrodes 50 touch the opposing line electrodes 48 at the pressed parts of sheet 46, and the conducting state is detected by the scanning circuits 54 and 56.

When the operation signal is feedbacked from the scanning circuit 56 to the CPU 18, the feedbacked operation signal is processed at STEP 108, and the coordinate positions of the parts of the sheet 46 on which the pressing force has been exerted are determined based on the operation signal. Moreover, virtual intersections on the display screen 14, which are corresponding to the coordinate positions (for example, positions of parts P indicated by triangles as shown in FIGS. 5A and 5B) of parts which the pressing force is exerted on the sheet 46 are determined based on the above determination result.

Subsequently, the control proceeds to STEP 110 of FIG. 8B. It is determined at STEP 110 whether information on the virtual intersections is included in the feedbacked operation signal, that is, whether at least any one set of the line electrodes 48 and the line electrodes 50 is in an electrically connected state. When it is determined at STEP 110 that the information on the virtual intersection is included in the operation signal, that is, that at any one set of the line electrodes 48 and 50 is electrically connected to each other, it is determined at STEP 112 in which first selection area 28 the virtual intersection included in the operation signal is included.

Figure 7:
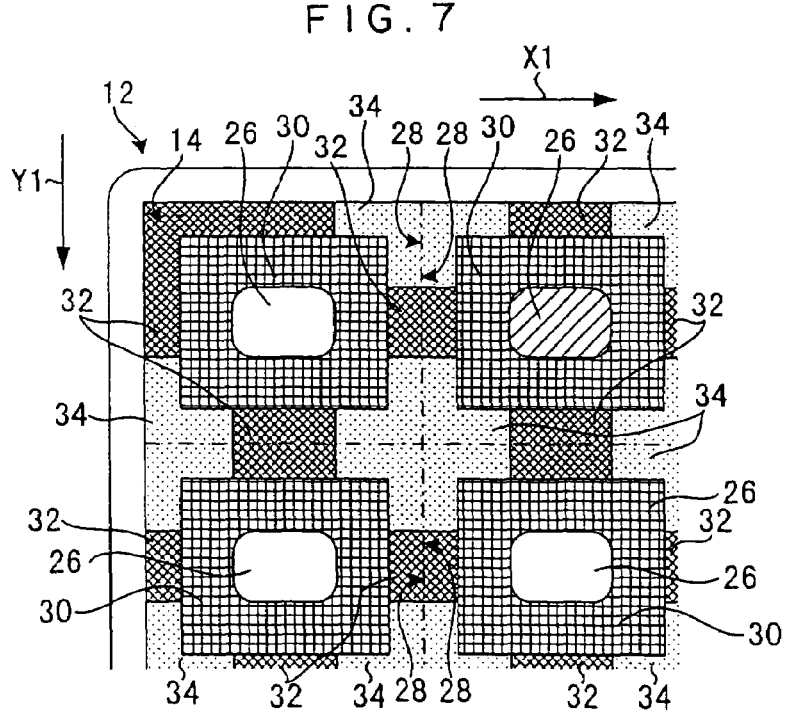
FIG. 7 is a view showing a state in which one of selection sections is selected, and corresponding to FIG. 6.

Then, a history of a virtual intersection included in an operation signal which has been received just before the current operation signal is read from the RAM 20 and the like at STEP 114, and, when it is determined at STEP 116 that there is no history, the color of the selection button 26 displayed in the first selection area 28 which includes the virtual intersection is reversed as shown in FIG. 7 (refer to the selection button 26 in the upper right of FIG. 7) to cause a state in which a function or an operation indicated by the selection button 26 is selected. Under such a condition, a function or an operation indicated by the selected selection button 26 is executed, for example, by operation of a decision button and the like provided with the controller 36 and the like.

Subsequently, information on the virtual intersection included in the operation signal is stored as a history in the RAM 20 and the like at STEP 120, and the processing returns to STEP 100 through STEP 122.

On the other hand, when no sets of line electrodes 48 and 50 are electrically connected to each other, that is, when the touch panel 42 is not pressed, it is determined at STEP 110 that there is no virtual intersection, and the history of the virtual intersection, which has been stored in the RAM 20 and the like, is deleted at STEP 124. Therefore, immediately after the selection processing program is executed, or when the touch panel 42 is pressed again once a finger 62 is separated from the touch panel 42, there is no history of a virtual intersection in the RAM 20. Thereby, basically, a function and the like corresponding to the selection button 26 in the first selection area 28 which includes a virtual intersection is put into a selected state, and the color of the selection button 26 is reversed.

Also, when it is determined at STEP 116 in a state in which an operation signal is feedbacked that there is the history of the last virtual intersection, it is determined at STEP 130 whether the position of the virtual intersection, which is included in the received operation signal, is located in the second selection area 30 or not. When it is determined at STEP 130 that the position of the virtual intersection, which is included in the received operation signal, is located in the second selection area 30, it is determined at STEP 132 whether the color of the selection button 26 in the second selection area 30 including the virtual intersection is reversed or not (that is, whether the function or the operation corresponding to the selection button 26 is put in the selected state or not)

Thereby, when the color of the selection button 26 is not reversed, COLOR REVERSing processing of the selection button 26 and selection processing of a function or an operation corresponding to the selection button 26 are executed at STEP 118. Also, when it is determined at STEP 132 that reversing of the color of the corresponding selection button 26 and selection of the function or the operation corresponding to the selection button 26 have been already executed, the processing proceeds to STEP 120.

On the other hand, when it is determined at STEP 130 that the position of the virtual intersection, which is included in the received operation signal, is not located in the second selection area 30, it is determined at STEP 134 whether the position of the virtual intersection, which is included in the received operation signal, is located in the gray zone 32 or not. When it is determined at STEP 134 that the position of the virtual intersection is not in the gray zone 32, the processing proceeds to STEP 120.

Since there has previously existed a history of a virtual intersection under such a condition, basically, the color of any one of the selection buttons 26 is reversed, and a state in which a function and an operation corresponding to the selection button 26 is selected is caused. However, the reversed state of the selection button 26, and the selected state of the function or the operation corresponding to the selection button 26 are maintained by proceeding from STEP 134 directly to STEP 120.

On the other hand, when it is determined at STEP 134 that the position of the virtual intersection is in the gray zone 32, the processing proceeds to STEP 136. It is determined at STEP 136 from the last virtual intersection in the history, which has been read at STEP 114, whether the last virtual intersection had been located in the cancellation zone 34 or not. When it is determined that the last position of the virtual intersection had not been in the cancellation zone 34, the processing proceeds to STEP 120. Therefore, even in the above case, the reversed state of the selection button 26, and the selected state of the function or the operation corresponding to the selection button 26 are maintained.

On the other hand when it is determined at STEP 136 that the last virtual intersection had been located in the cancellation zone 34, a history at a time when the virtual intersection had been located in the gray zone 32 is read at STEP 138 from the RAM 20 and the like. At STEP 140, it is determined whether a gray zone 32 in which the last virtual intersection among the virtual intersections which had been located in the gray zone 32 and a gray zone 32 in which the virtual intersection is currently located are in the same first selection area 28 or not.

When it is determined at STEP 140 that the gray zone 32 in which the virtual intersection had been recently located is the same as the gray zone 32 in which the virtual intersection is currently located, the processing proceeds to STEP 120.

That is, though a moving trajectory of the virtual intersection corresponding to the position of the finger 62 on the touch panel 42 passes the cancellation zone 34 under such a condition, basically, it is shown that the intersection returns to the former gray zone 32. Therefore, in this case, the reversed state of the selection button 26, and the selected state of the function or the operation corresponding to the selection button 26 are maintained.

On the other hand, when it is determined at STEP 140 that the gray zone 32 in which the virtual intersection is currently located is different from the gray zone 32 in which the virtual intersection had been recently located, the processing proceeds to STEP. 142. At 142, the color of the selection button 26 which had been previously reversed is restored to the former color, and the function or the operation corresponding to the selection button 26 is released.

As explained above, in the embodiment, even when a virtual intersection is apart from the selection button 26, or the second selection area 30 around the button 26, basically, by moving the finger 62 on the touch panel 42, the selected state including reversing of the color of the selection button 26 is never released if the virtual intersection is located in the gray zone 32. Thereby, even when the finger 62 is vibrated or slightly moved on the touch panel 42 due to vibration and the like of a vehicle, the selected state is never released in an unintentional manner, or the colors of the adjacent other selection buttons 26 are not reversed in an involuntary manner (That is, functions or operations corresponding to the adjacent other selection buttons 26 are never selected.)

Thus, the operability is extremely excellent in the embodiment, as prevention of very small movement or vibration of the finger 62 on the touch panel 42 is not strictly required at operation of the controller 36.

On the other hand, when a virtual intersection moves from a gray zone 32 to a cancellation zone 34 by movement of a finger 62 on the touch panel 42, and, further, to a gray zone 32 in the first selection area 28 which is different from the first selection area 28 which includes a gray zone 32 in which the virtual intersection had been previously located, the selected state of the selection button 26 and the function or the operation corresponding to the button 26 are released. That is, when the position of a virtual intersection (in other words, the position of a finger 62 on the touch panel 42) has been already apart largely from the selection button 26 by moving a virtual intersection following a moving trajectory as described above, the selected state of the selection button 26 and the function or the operation corresponding to the button 26 are released.

Thereby, sensory (operational feeling) difference between the position of the finger 62 on the touch panel 42 and the position of the selected selection button 26 may be reduced or eliminated. From the above reason, the operability may be also improved.

Here, though a configuration in which the gray zone 32 is set around the second selection area 30 as described above is applied in the embodiment, a method or a condition of setting a gray zone 32 is not limited to that of the above embodiment. Therefore, for example, a configuration in which the range of a gray zone 32 is set for each menu display screen beforehand may be applied, or a configuration, in which a gray zone 32 is automatically set based on the position of the selection button 26 displayed on the display screen 14, on the distance between adjacent selection buttons 26 to each other, and the like, may be adopted.

<Second Embodiment>

Then, other embodiments according to the invention will be explained. Here, parts substantially similar to those previously described with reference to embodiments, including the above-described first embodiment, which have been described before the embodiment which is being currently explained will be denoted by the same reference numbers as those in the previous embodiments, and the explanation will be eliminated in the explanation of the following embodiments to be described later.

Moreover, steps for substantially similar processing to the processing in steps of flow charts for selection processing programs previously applied with reference to embodiments, including the above-described first embodiment, which have been described before the embodiment which is being currently explained will be denoted by the same step numbers as those in the previous embodiments, and the explanation will be eliminated in the following explanation of selection processing programs in the embodiments to be described later.

Figure 9:
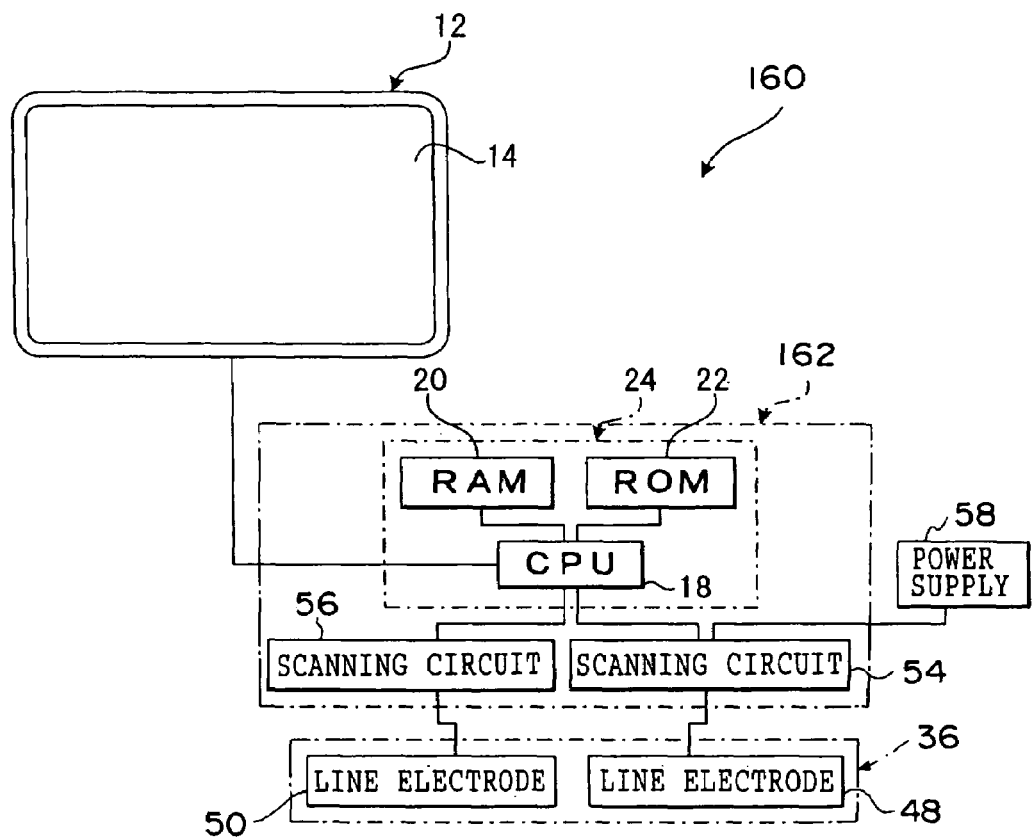
FIG. 9 is a schematic block diagram showing a configuration of a display screen operation device according to a second embodiment of the invention.

FIG. 9 shows a schematic view of a configuration of a central control device 160 to which a display screen operation device according to a second embodiment of the invention is applied. Though the basic configuration is the same as that of a central control device 10 according to a first embodiment as shown in FIG. 9, processing in a control section 162 is different from that of a control section 16 of the central control device 10 in the above-described first embodiment.

Figure 10B:
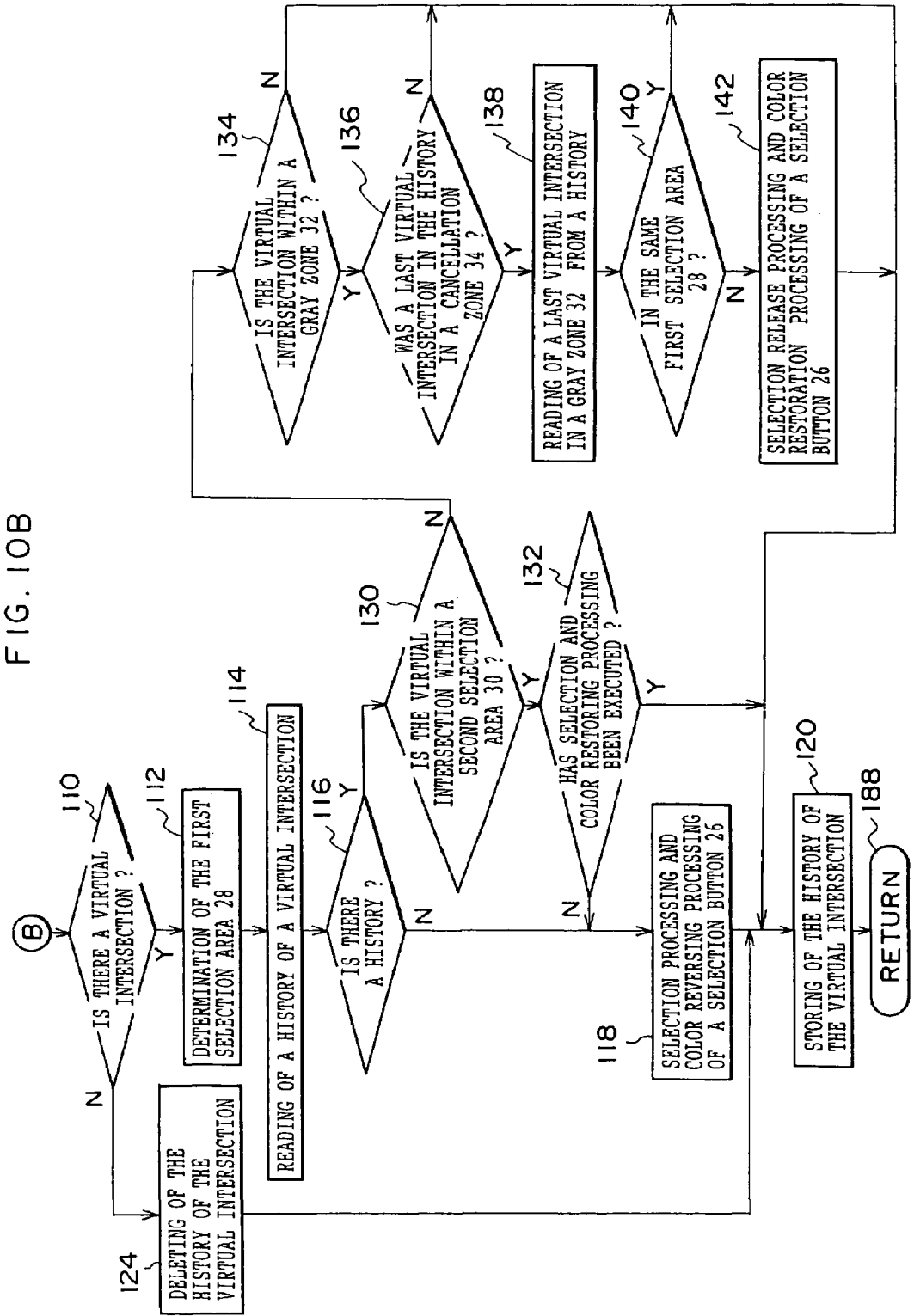

That is, when the selection processing program is executed at STEP 180, and various kinds of initialization are executed at STEP 102, a scanning circuit 54 is operated at STEP 106, each line electrode 48 is connected to a power supply 58 according to a predetermined order to operate a scanning circuit 56 which detects the conducting states of each line electrode 50 according to a predetermined order, and an operation signal including information on the conducting states is sent to the CPU 18 in the embodiment, as shown in a schematic flow chart of a selection processing program according to the embodiment in FIG. 10A and FIG. 10B.

Then, though the operation signal is processed at STEP 182 basically in a similar manner to that of STEP 108 (refer to FIG. 8A), a pressed range of a finger 62 on a touch panel 42 is determined at STEP 184, based on the processing result of the operation signal.

That is, when the finger 62 touches the touch panel 42 being aligned generally perpendicular to the tough panel as shown in FIG. 4A, the pressed range by the finger 62 has a small difference (ratio) between the width dimension and the dimension in the length direction (direction from the root to the fingertip of the finger 62) of the finger 62 as shown in FIG. 5A. On the other hand, when the finger 62 touches the touch panel 42 being aligned generally parallel to the touch panel as shown in FIG. 4B, the dimension in the length direction becomes larger than that of the width of the finger 62 as shown in FIG. 5B.

Thereby, the posture of the finger 62 on the touch panel 42 is determined (STEP 184) by detecting a number of electrically connected parts along the X2 direction between the line electrodes 48 and 50, and that of electrically connected parts along the Y2 direction between the line electrodes 48, and 50 (STEP 182).

Subsequently, a second selection area 30, gray zones 32, and cancellation zones 34 are set at STEP 186 for each selection button 26, based on the detection result (at STEP 182) and the determination result (at STEP 184).

Figure 11:
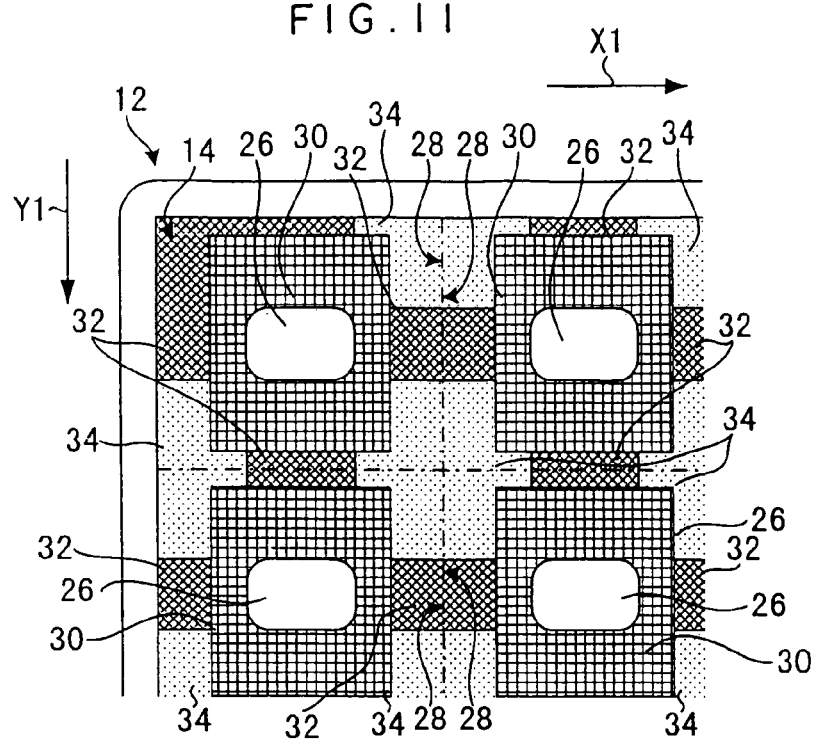
FIG. 11 is a view showing a state, in which ranges of maintenance areas and release areas have been changed, and corresponding to FIG. 6.

Here, when it is found from the detection result (at STEP 182) and the determination result (at STEP 184) that difference between the number of the electrically connected parts along the X2 direction between the line electrodes 48 and 50, and that of electrically connected parts along the Y2 direction between the line electrodes 48, and 50 is small, the widths of the gray zones 32 and the cancellation zones 34 along the X1 direction on the display screen 14 are enlarged, and the ranges of the second selection areas 30 along the X1 direction are reduced by the enlarged widths of the gray zones 32 and the cancellation zones 34 as shown in FIG. 11 in the embodiment. Moreover, the widths of the gray zones 32 and the cancellation zones 34 along the Y1 direction on the display screen 14 are reduced, and the ranges of the second selection areas 30 along the Y1 direction are enlarged by the reduced widths of the gray zones 32 and the cancellation zones 34 (that is, the ranges of the first selection areas 28 do not change).

Incidentally, the characteristics of the moving direction of the finger 62 when the finger 62 is slightly moved on the touch panel 42 depend on the posture of the finger 62, and when the finger 62 touches the panel 42 being aligned generally perpendicular to the touch panel, the movement in the transverse direction (X2 direction) is likely to be large, but, the movement in the longitudinal direction (Y2 direction) is inclined to be small. On the other hand, when the finger 62 touches the panel 42 being aligned generally parallel to the touch panel, the movement in the longitudinal direction (Y2 direction) is likely to be large, but, the movement in the transverse direction (X2 direction) is inclined to be small.

Here, when difference between the number of the electrically connected parts along the X2 direction between the line electrodes 48 and 50, and that of electrically connected parts along the Y2 direction between the line electrodes 48, and 50 is small, the widths of the gray zones 32 and the cancellation zones 34 along the X1 direction are enlarged, and the ranges of the second selection areas 30 along the X1 direction are reduced by the enlarged widths of the gray zones 32 and the cancellation zones 34 as described above.

Therefore, in this case, even when the finger 62 is comparatively largely moved in the direction from the sides of the selection buttons 26, the color of which has been reversed (that is, selection processing is executed), to the X2 direction, the selected state is neither released nor changed, if the finger 62 does not move to the second selection areas 30 which include adjacent selection buttons 26, crossing the gray zones 32 and the cancellation zones 34, which are set wider than usual.

Thereby, since the touch panel 42 is pressed by the finger 62 aligned generally perpendicular to the touch panel, unintentional release or change of the selected state, change of the color of the selection buttons 26 caused by the unintentional release or change may be prevented even when the finger 62 is comparatively largely moved in the X1 direction due to vibration and the like of a vehicle. From the above reason, the operability may be improved.

On the other hand, in this case, the widths of the gray zones 32 and the cancellation zones 34 along the Y1 direction are reduced, and the ranges of the second selection areas 30 along the Y1 direction are enlarged by the reduced widths of the gray zones 32 and the cancellation zones 34.

Therefore, in this case, since the finger 62 is moved in the direction from the sides of the selection buttons 26, the color of which has been reversed (that is, selection processing is executed), to the Y2 direction, the finger 62 is moved in a comparatively easy manner to the second selection areas 30 which include adjacent selection buttons 26, crossing the gray zones 32 and the cancellation zones 34, and the selected state which has been put is released or changed.

However, when the finger 62 presses the touch panel 42 being aligned generally perpendicular to the touch panel as described above, the movement in the Y2 direction becomes small. Therefore, as long as the finger 62 is not intentionally moved in the Y2 direction, that is, as long as other selection buttons 26 are not intentionally selected, it is not easy to move the finger 62 to the second selection areas 30 which includes adjacent selection buttons 26.

Also, since the movement of the finger 62 in the Y2 direction when the touch panel 42 is pressed by the finger 62 being aligned generally perpendicular to the touch panel as described above, comparatively large movement of the finger 62 in the Y2 direction is intentionally executed in many cases. Here, in this case, the widths of the gray zones 32 and the cancellation zones 34 along the Y1 direction are reduced, and the ranges of the second selection areas 30 are enlarged by the reduced width. Therefore, the selected state is immediately released or changed even by comparatively small movement of the finger 62 in the Y2 direction. That is, since the response of the display screen 14 is basically quicker when the finger 62 is aligned generally perpendicular to the touch panel and intentionally moved, and the operability becomes extremely high as operational feeling and the state on the display screen 14 quickly agree with each other.

Figure 12:
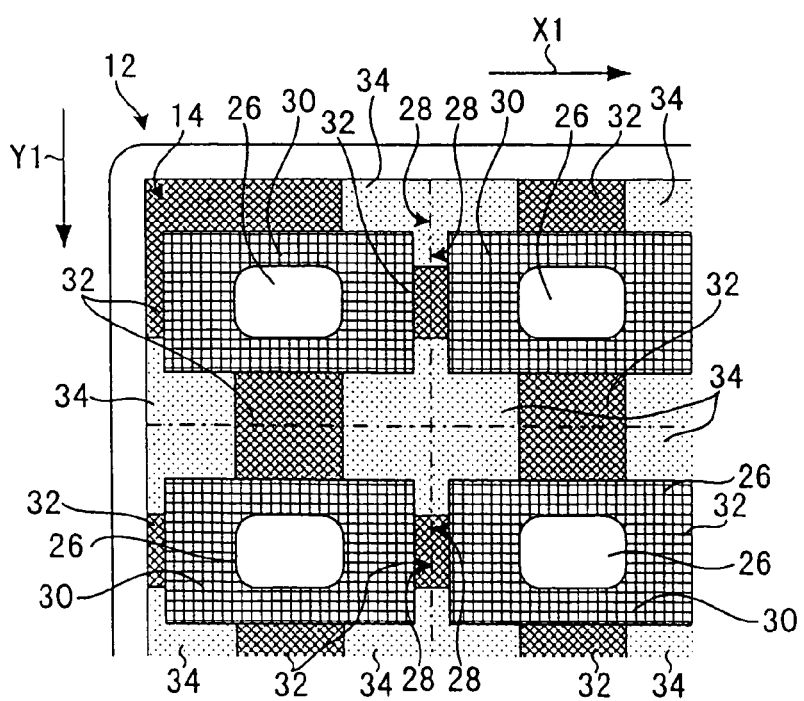
FIG. 12 is a view showing a state, in which the ranges of the maintenance areas and the release areas have been changed in a different manner from those of FIG. 11, and corresponding to FIG. 6.

On the other hand, when the number of the electrically connected parts between the line electrodes 48 and 50 along the Y2 direction is comparatively larger than that of the electrically connected parts between the line electrodes 48 and 50 along the X2 direction as described (that is, when the touch panel 42 is pressed by the finger 62 which is aligned generally parallel to the touch panel), the widths of the gray zones 32 and the cancellation zones 34 along the Y1 direction are enlarged, and the ranges of the second selection areas 30 along the Y1 direction are reduced by the enlarged widths of the gray zones 32 and the cancellation zones 34 as shown in FIG. 12.

Therefore, in this case, even when the finger 62 is comparatively largely moved in the direction from the sides of the selection buttons 26, the color of which has been reversed (that is, selection processing is executed), to the Y2 direction, the selected state which has been put is neither released nor changed, if the finger 62 moves to the second selection areas 30 which include adjacent selection buttons 26, crossing the gray zones 32 and the cancellation zones 34, which are set larger than usual one.

Therefore, since the touch panel 42 is pressed by the finger 62 which is aligned generally parallel to the touch panel, unintentional release or change of the selected state, change of the color of the selection buttons 26 caused by the unintentional release or change may be prevented even when the finger 62 is comparatively largely moved in the Y1 direction due to vibration and the like of a vehicle. From the above reason, the operability may be improved.

On the other hand, in this case, the widths of the gray zones 32 and the cancellation zones 34 along the X1 direction are reduced, and the ranges of the second selection areas 30 along the X1 direction are enlarged by reduced widths of the gray zones 32 and the cancellation zones 34.

Thereby, in this case, since the finger 62 is moved in the direction from the sides of the selection buttons 26, the color of which has been reversed (that is, selection processing is executed), to the X2 direction, the finger 62 moves in a comparatively easy manner to the second selection areas 30 which include adjacent selection buttons 26, crossing the gray zones 32 and the cancellation zones 34, and the selected state is released or changed.

However, when the finger 62 presses the touch panel 42 being aligned generally parallel to the touch panel as described above, the movement in the X2 direction becomes small. Therefore, as long as the finger 62 is not intentionally moved in the Y2 direction, that is, as long as other selection buttons 26 are not intentionally selected, it is not easy to move the finger 62 to the second selection areas 30 which includes adjacent selection buttons 26.

Also, since the movement of the finger 62 in the X2 direction when the touch panel 42 is pressed by the finger 62 in an approximately parallel manner is small as described above, comparatively large movement of the finger 62 in the X2 direction is intentionally executed in many cases.

Here, in this case, the widths of the gray zones 32 and the cancellation zones 34 along the X1 direction are reduced, and the ranges of the second selection areas 30 are enlarged by the reduced width. Therefore, the selected state is immediately released or changed even by comparatively small movement of the finger 62 in the X2 direction. That is, since the response of the display screen 14 is basically quicker when the finger 62 is aligned generally parallel to the touch panel and intentionally moved, and the operability becomes extremely high as operational feeling and the state on the display screen 14 quickly agree with each other.

As described above, the ranges of the second selection areas 30, the gray zones 32, and cancellation zones 34 are appropriately set according to the posture of the finger 62 on the touch panel 42, unintentional release or change of the selected state due to the movement may be reduced or prevented. Moreover, the operability is extremely excellent as a state on the display screen 14 may respond to the movement of the finger 62 by quick switching of the selected states.

<Third Embodiment>

Then, a third embodiment according to the invention will be explained.

Figure 13:
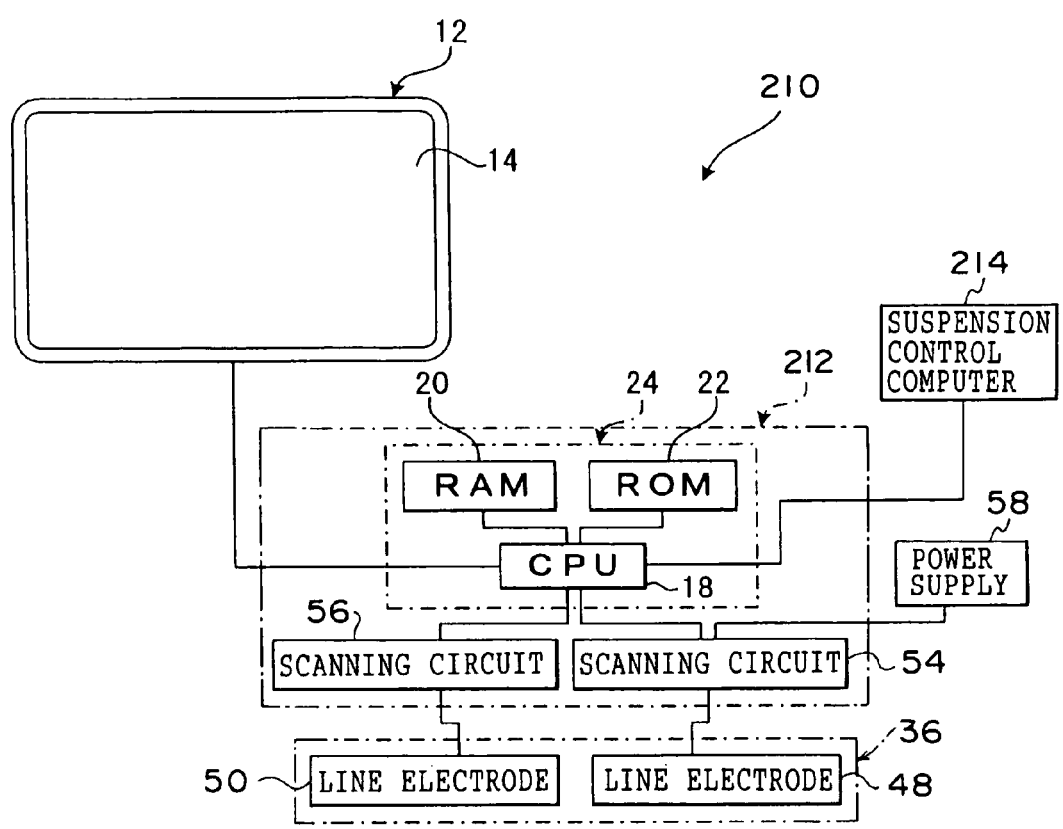
FIG. 13 is a schematic block diagram showing a configuration of a display screen operation device according to a third embodiment of the invention.

FIG. 13 shows a schematic view of a configuration of a central control device 210 to which a display screen operation device according to the embodiment is applied. Though the basic configuration is the same as that of a central control device 10 according to a first embodiment as shown in FIG. 13, processing in a control section 212 is different from that of a control section 16 of the central control device 10 in the above-described first embodiment. Also, in the central control device 10, a suspension control computer 214 is connected to a CPU 18 which forms a computer 24 in the control section 212.

The suspension control computer 214 basically forms an electronic controlled suspension device of a vehicle. For example, the vibrating state of the vehicle is determined, based on signals from various kinds of sensors such as a speed sensor, an acceleration sensor, a rudder sensor, and a height sensor, which are provided at appropriate positions of the vehicle, and a shock absorber is adjusted according to the vibrating state (the above-described devices with no reference numerals are not shown in the drawings.)

Here, in the embodiment, a vibration signal according to the vibrating state of the vehicle is sent from the suspension control computer 214 to the CPU 18 of the computer 24. Patterns of second selection areas 30, gray zones 32, and cancellation zones 34, with a range (size) which changes according to the vibration signal, are stored in a ROM 22 and the like of the computer 24.

Figure 14B:
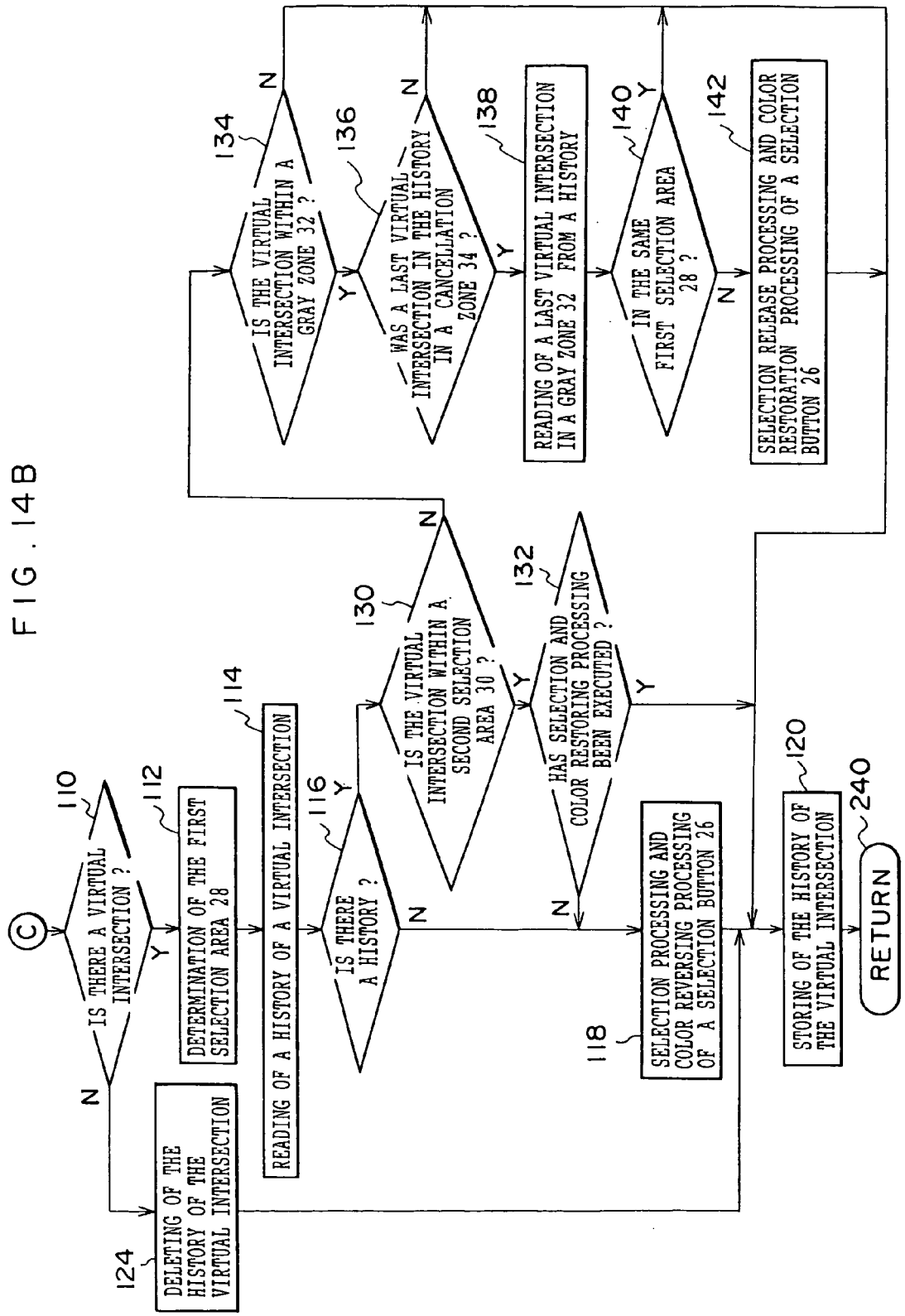

That is, when a selection processing program is executed at STEP 230 in the embodiment as shown in flow charts of FIG. 14A and FIG. 14B, and various kinds of initialization are executed at STEP 102, the vibration signal from the suspension control computer 214 is read at STEP 232.

Subsequently, the vibration signal is processed and the current vibrating state of the vehicle is determined at STEP 234. Moreover, patterns of second selection areas 30, gray zones 32, and cancellation zones 34, which have been set at STEP 236 beforehand and have been stored in the ROM 22 are read, and the second selection areas 30, the gray zones 32, and the cancellation zones 34 are set at STEP 238 on the display screen so that the areas 30, the zones 32 and 34 have a range which has been set in patterns suitable for the determined vibrating state.

Here in the embodiment, the larger vibration causes the more reduced second selection areas 30, and, according to the reduced areas, the gray zones 32 and the cancellation zones 34 are enlarged with regard to the patterns of the second selection areas 30, the gray zones 32, and the cancellation zones 34. Therefore, even when the finger 62 is largely moved on the touch panel 42 as the vibration of the vehicle is large, the selected state is neither changed nor released, as long as the finger 62 is moved to a location corresponding to the second selection areas 30 which include adjacent selection buttons 26 to a selection button 26 in a selected state, crossing the gray zones 32 and the cancellation zones 34, which have been set larger than usual ones.

On the other hand when vibrations of the vehicle are comparatively slight, for example, when the vehicle stops, the second selection areas 30 are enlarged, and, according to the enlarged areas, the gray zones 32 and the cancellation zones 34 are reduced. The selected state is easily changed or released by movement of the finger 62 on the touch panel 42.

That is, since unintentional movement of the finger 62 rarely occur under such a state, movement of the finger 62 on the touch panel 42 is basically intentional one, which has an object to change or release the selected state. Here, under such a state, the selected state is easily changed, or released by moving the finger 62 on the touch panel 42 as described above, and the response of the display screen 14 is quick.

As described above, in the embodiment, unintentional release or change of the selected state, following the movement of the finger 62 may be effectively prevented in a state in which the finger 62 is easily moved. Furthermore, since the display screen 14 may be configured to quickly respond to the movement of the finger 62 in a state in which the finger 62 does not move easily, the operability is extremely excellent.

<Fourth Embodiment>

Then, a fourth embodiment according to the invention will be explained.

Figure 15:
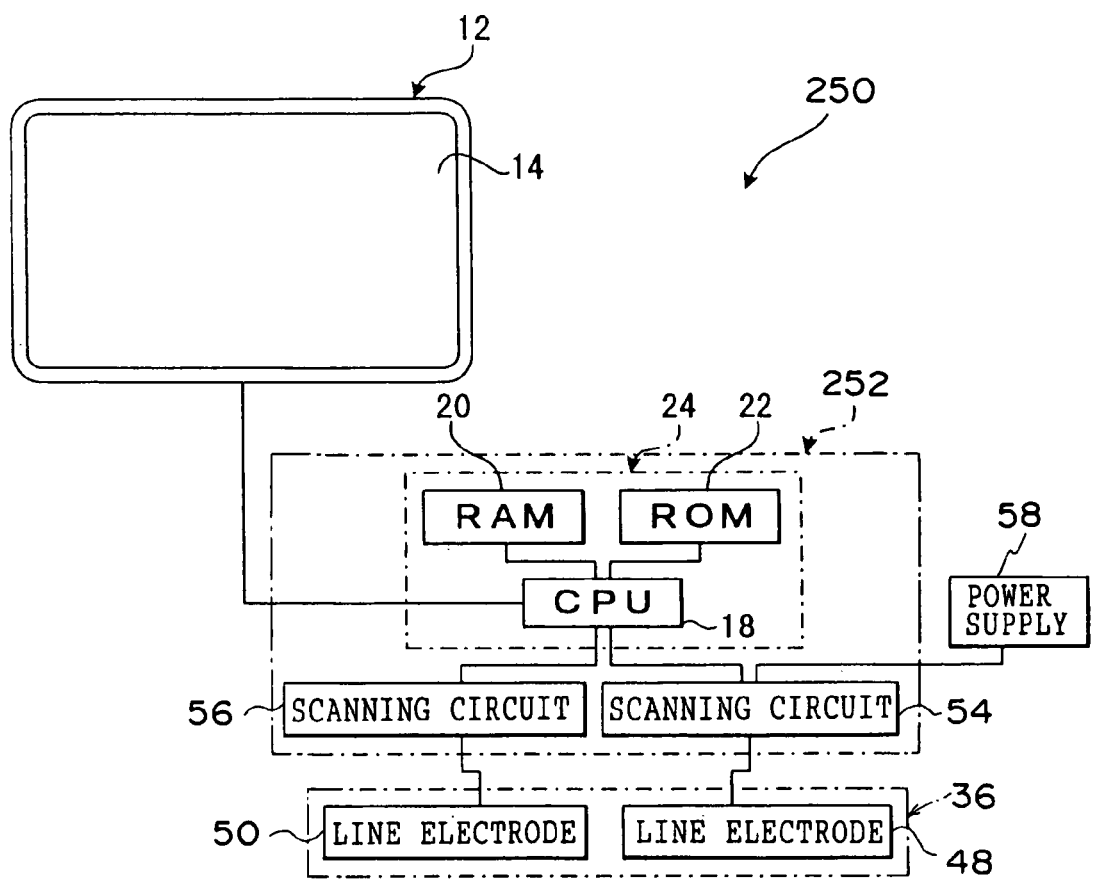
FIG. 15 is a schematic block diagram showing a configuration of a display screen operation device according to a fourth embodiment of the invention.

FIG. 15 shows a schematic view of a configuration of a central control device 250 to which a display screen operation device according to the embodiment is applied. Though the basic configuration is the same as that of a central control device 10 according to a first embodiment as shown in FIG. 15, processing in a control section 252 is different from that of a control section 16 of the central control device 10 in the above-described first embodiment.

That is, in the embodiment, selection processing is executed by the basically same selection processing program as that which has been explained in the first embodiment. However, in the embodiment, the color (that is, wave length of light) of the selection buttons 26 as a notification signal displayed on a monitor 12 as a notification signal transmission unit is not only reversed and restored, but also changed using neutral tints.

Figure 16A:
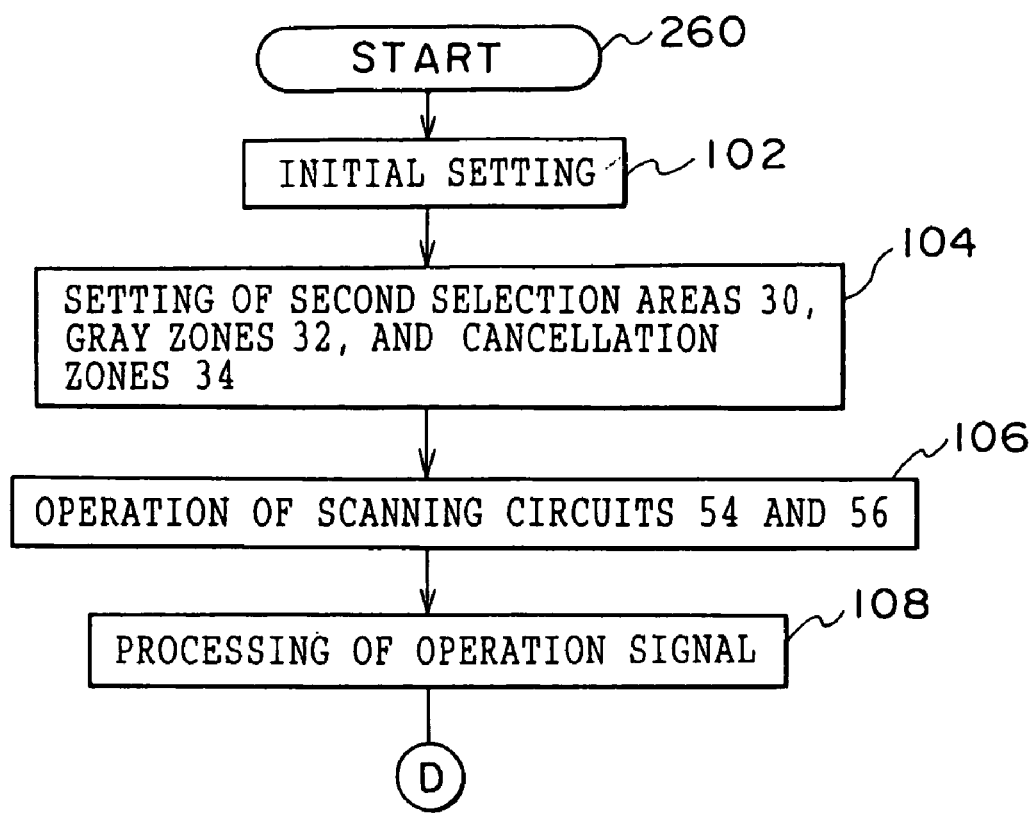
FIG. 16A and FIG. 16B are schematic flow charts showing control of the display screen operation device according to the fourth embodiment of the invention.
Figure 16B:
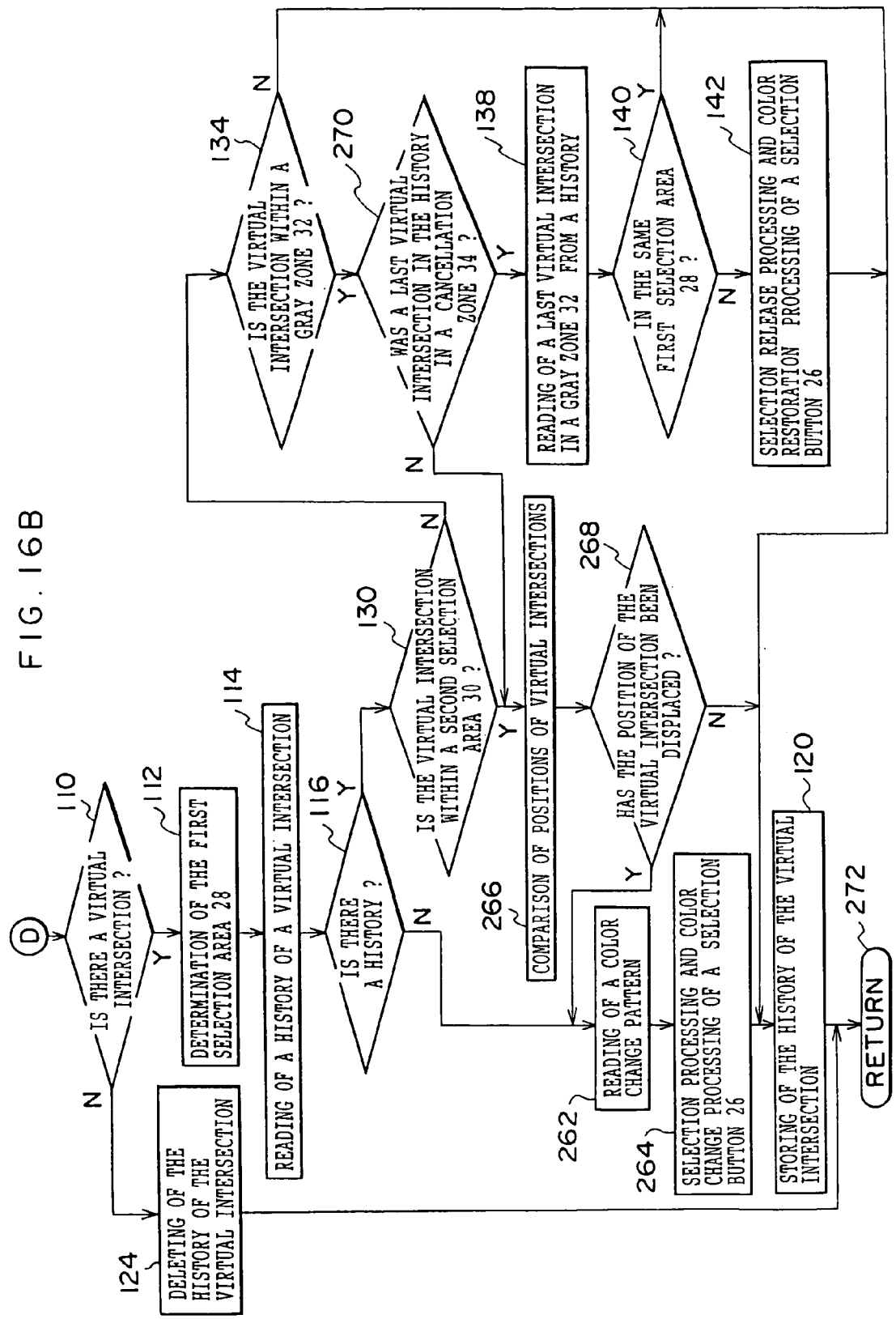

In the embodiment, as shown in flow charts of FIG. 16A and FIG. 16B, similar processing to that of the above first embodiment is executed after the selection processing program is executed at STEP 260, a color change patter which has been stored in the ROM 22 and the like beforehand is read at STEP 262 when it is determined at STEP 116 that the history of a last virtual intersection does not exist. Subsequently, the selection processing is executed, and the color of the corresponding selection button 26 is changed to a color corresponding to a position of a virtual intersection at STEP 264.

Here, as shown in FIG. 7 (refer to the selection button 26 in the upper right of FIG. 7), when a virtual intersection is approximately at a center position of the selection button 26, so-called color reversing processing is performed at STEP 264 in the embodiment.

Figure 17:
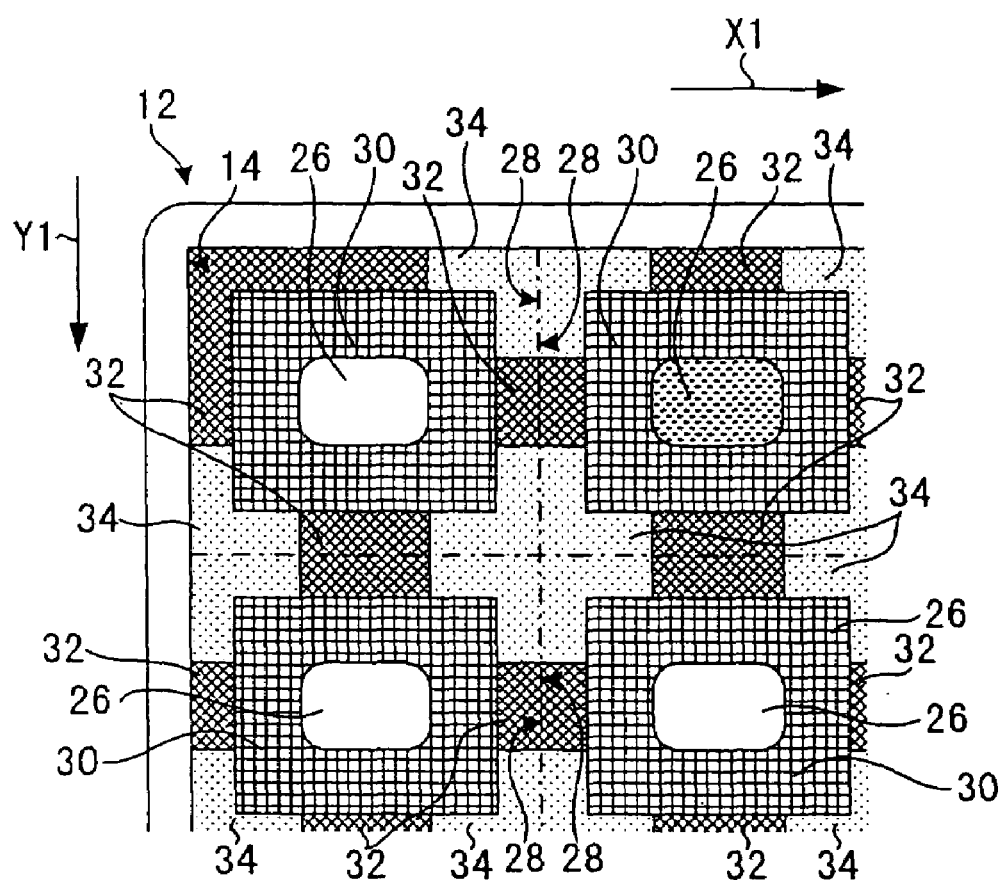
FIG. 17 is a view showing a state, in which a selection section is put into an intermediate color, and corresponding to FIG. 6.

On the other hand, when a virtual intersection is located near the periphery of the selection buttons 26, or at a position except a position in the selection button 26 within the first selection areas 28 which include the selection button 26, the color of the selection button 26 is changed to a neutral color between the former color (that is, a color indicating a non-selected state) and the color for the reversed state (refer to the selection button 26 in the upper right of FIG. 17).

Thereby, the amount of difference between a position, on the display screen 14, of the selection button 26 to be selected and a position of the finger 62 on the touch panel 42 may be understood by determining the color of the selection buttons 26, and the amount of movement of the finger 62 to the selection button 26 to be selected may be understood.

On the other hand, when it is determined at STEP 130 that a virtual intersection is located within the second selection area 30, the current position of the virtual intersection is compared with a position of a last virtual intersection based on a history of the last virtual intersection at STEP 266. Subsequently, when the current position of the virtual intersection is displaced to the last position of the virtual intersection at STEP 268, the processing proceeds to STEP 264 through STEP 262.

Thereby, for example, when a last position of the virtual intersection is at one of an approximately center of the selection button 26, or any point in the range of first selection area 28, except at an approximately center of the selection button 26, and a current position of the virtual intersection is at the other point of them, the color of the selection button 26 is changed as described above. Thereby, it is understood whether the position of the finger 62 on the touch panel 42 has approached an approximately center of the selection button 26, or has separated from an approximately center of the selection button 26.

Incidentally, there is another configuration, as another unit to understand to what position on the display screen 14 of the monitor 12 the position of the finger 62 on the touch panel 42 is corresponding, by which for example, a pointer imitating an arrow mark and the like is configured to be moved on the display screen 14 according to the movement of the finger 62 on the touch panel 42.

However, when the pointer overlaps the selection button 26, there is a possibility in the configuration that it becomes difficult to recognize characters, signs, and the like, which are displayed on the selection button 26.

Also, in the configuration in which the pointer is applied, when the size of the selection button 26 is made smaller, there is a possibility that it becomes difficult to recognize the selection button 26 as the pointer largely overlaps the selection button 26 if the pointer is not made smaller too, or to discern a selected state as the pointer covers and overlaps a plurality of selection buttons 26. However, it becomes difficult to recognize the pointer itself in the case of the smaller pointer.

On the other hand, since the position of the finger 62 on the touch panel 42 may be understood by change of the color of the selection button 26 in the embodiment, it does not become difficult to recognize characters, signs, and the like which are displayed on the selection button 26. Furthermore, since it is easy to understand which of the selection buttons 26 are in a selected state, the operability is extremely excellent.

Here, though the embodiment has had a configuration by which the monitor is applied as a notification signal transmission unit, and the color of the selection button 26 (that is, wave length of light) is applied as a notification signal, the configurations of the notification signal transmission unit and the notification signal are not limited to those in the above embodiments.

For example, there may be adopted a configuration by which a speaker is applied to the notification signal transmission unit, sound is adopted as the notification signal, and a musical scale (sound frequency) is changed according to the position of the virtual intersection.

Also, there may be adopted a configuration by which for example, a motor with an eccentric mass fixed on a rotating shaft is provided as a notification signal transmission unit in a controller 36, and is operated to cause vibration as a notification signal by the motor, and the vibration is conveyed to a hand, which touches the controller 36, through the controller 36, and the rotating speed of the motor is changed according to the position of a virtual intersection to convey, to the hand, vibration of different modes according to the position of the virtual intersection.

<Fifth Embodiment>

Then, a fifth embodiment according to the invention will be explained.

Figure 18A:
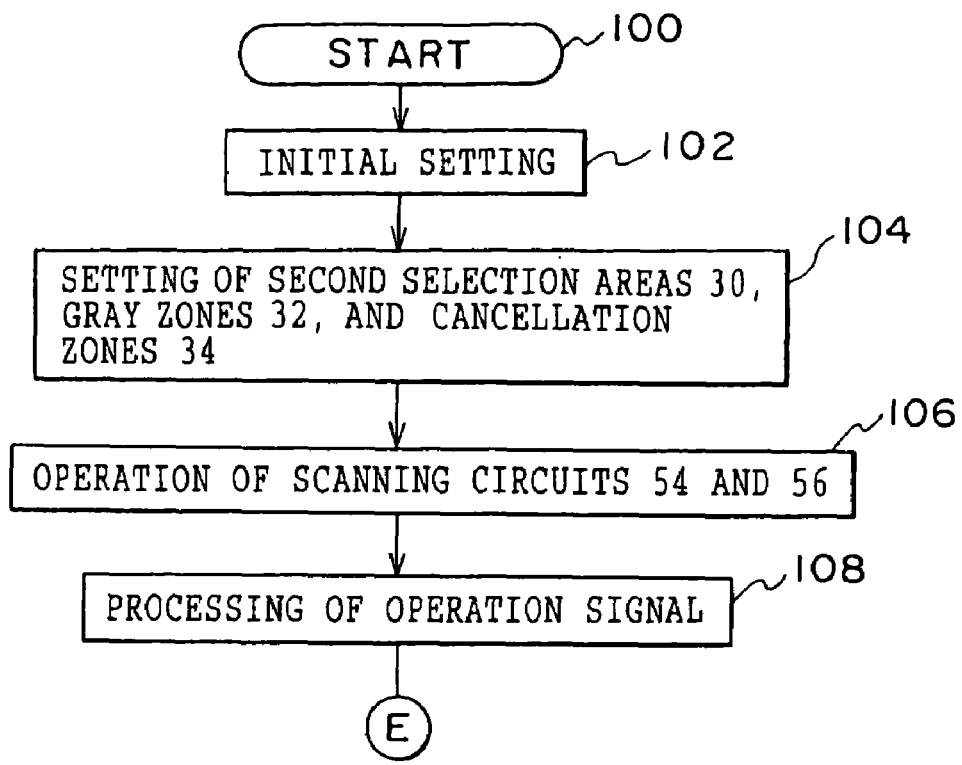

A schematic configuration of a central control device 250 to which a display screen operation device according to the embodiment is applied is similar to that of the first embodiment (FIG. 1). However, when a negative judgment is obtained at STEP 274, that is, when the position of the current virtual intersection is in a cancellation zone 34, the processing proceeds to STEP 142, at which selection releasing processing and color restoring processing of a selection button 26 are executed as shown in a flow chart of FIG. 18B. On the other hand, when an affirmative judgment is obtained at STEP 274, the processing proceeds to STEP 136.

Thus, in the fifth embodiment, the selected state of a virtual intersection is released when the intersection is located in a cancellation zone in a first selection area 28, and the selected state is released or maintained according to the moving history of the virtual intersection when the intersection is located in a gray zone. Accordingly, the operability may be improved, as the selection button 26 is displayed in an appropriate color even when the unintentional movement of a finger is generated.

Here, the first through fifth embodiments may have the following process: When an affirmative determination is obtained at STEP 134, it is determined whether the last position of a virtual intersection according to the moving history of the intersection is in a cancellation zone 34 of a first selection area 28 other than the current first selection area 28, and when the last position is in the cancellation zone 34 of the first selection area 28 other than the current first selection area 28, it is determined whether selection and color changing processing of the selection button 26 of the first selection area 28 other than the current first selection area 28 have been executed or not. When the both pieces of the processing have been executed, the processing proceeds to STEP 142, and the selected state of the first selection area 28 other than the current first selection area 28 is released. When the both pieces of the processing have not been executed, the processing may proceed to STEP 120.

Also, when a negative determination is obtained at STEP 134, it is determined whether the last position of the intersection is in a gray zone 32 of a first selection area 28 other than the current first selection area 28, and when the last position is in the gray zone 32 of the another first selection area 28, it is determined whether selection and color changing processing of the selection button 26 of the first selection area 28 other than the current first selection area 28 have been executed or not. When the both pieces of the processing have been executed, the processing proceeds to STEP 142, and the selected state of the first selection area 28 other than the current first selection area 28 is released. When the both pieces of the processing have not been executed, the processing proceeds to STEP 120.

As explained above, unnatural feeling at operation may be reduced, and the operability may be improved in the invention.

What is claimed is:

1. A display operation device, comprising:
an operation unit which transmits an operation signal including position information according to a position on a display screen of a monitor; and
a control unit which is connected to the monitor, and displays a plurality of selection sections at a predetermined positions on the display screen, which sets a selection section to a selected state when the position information of the operation signal sent from the operation unit corresponds to any one of the plurality of selection sections in a state where the plurality of selection sections are displayed, and sets maintenance areas respectively corresponding to the plurality of selection section; in predetermined ranges on the display screen which ranges each include one of the plurality of selection sections, maintains a state of the display screen in a state thereof before receiving the operation signal, when the position information of the operation signal from the operations unit corresponds to a position within the maintenance area, and, further changes the set ranges of the maintenance area based on the processing of a vibration signal.

2. A display operation device, comprising:
an operation unit which transmits an operation signal including position information according to a position on a display screen of a monitor; and
a control unit which is connected to the monitor, displays a plurality of selection sections at predetermined positions on the display screen, sets a selection section to a selected state when the position information of the operation signal sent from the operation unit includes the selection section and corresponds to an area corresponding to the selection section, sets release areas and maintenance areas at positions away from each of the plurality of selection sections on the display screen and between the plurality of selection sections, and sets the selected state into a non-selected states, when (1) the position information is displaced from a position in a release area corresponding to a first selection section to a position in a maintenance area corresponding to a second selection section, or (2) when the position information is displaced from a position in a maintenance area corresponding to the first selection section to a position in a release area corresponding to the second selection section, or when both conditions (1) and (2) are present,
wherein said control unit controls a size of said maintenance area according to a magnitude of vibration.

3. A display operation device according to claim 2, wherein the control unit controls a color of the selection section, according to whether the selection section is in a selected state or a non-selected state.

4. A display operation device according to claim 3, wherein the control unit changes the color of the selection section in the selected state according to a distance from a current position, which is expressed by the position information, to a position of the selection section.

5. A display operation device according to claim 2, wherein the control unit controls a size of the maintenance area according to an operating state.

6. A display operation device according to claim 5, wherein the operation unit is a touch panel, and the operating state is a shape of a contact surface on the touch panel.

7. A display operation device according to claim 2, wherein the magnitude of the vibration which influences on the operation of the operation unit is the magnitude of vibration of a vehicle in which the display operation device is installed.

8. A display operation device according to claim 2, wherein the display operation device further comprises a notification signal output section, and the control unit controls the notification signal output section in the selected state of the selection section according to the distance from a current position, which is expressed by the position information, to a position of the selection section.

9. A display operation device according to claim 8, wherein the notification signal output section is a voice output device, and a voice output from the voice output device is changed in the selected state of the selection section according to the distance from the current position, which is expressed by the position information, to the position of the selection section.

10. A display operation device according to claim 8, wherein the notification signal output section is a vibration output device, and vibration output from the vibration output device is changed in the selected state of the selection section according to the distance from the current position, which is expressed by the position information, to the position of the selection section.

* * * * *